United States Patent
Milton et al.

(10) Patent No.: US 11,001,129 B2
(45) Date of Patent: *May 11, 2021

(54) CARGO DOOR FOR SEMI-TRUCK

(71) Applicant: Nikola Corporation, Phoenix, AZ (US)

(72) Inventors: Trevor R. Milton, Phoenix, AZ (US);
Stephen Jennes, Glendale, AZ (US);
Markus Scholten, Irvine, CA (US)

(73) Assignee: Nikola Corporation, Phoenix, AZ (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/509,073

(22) Filed: Jul. 11, 2019

(65) Prior Publication Data

US 2019/0329635 A1 Oct. 31, 2019

Related U.S. Application Data

(63) Continuation-in-part of application No. 15/889,159, filed on Feb. 5, 2018, now Pat. No. 10,661,844, which
(Continued)

(51) Int. Cl.
*B62D 33/06* (2006.01)
*B60J 5/06* (2006.01)
(Continued)

(52) U.S. Cl.
CPC .............. *B60J 5/06* (2013.01); *B60J 5/0488* (2013.01); *B60J 5/0497* (2013.01); *B60L 50/66* (2019.02);
(Continued)

(58) Field of Classification Search
CPC ..... B62D 33/0612; B62D 33/06; B60J 5/0497
See application file for complete search history.

(56) References Cited

U.S. PATENT DOCUMENTS 2,866,651 A  12/1958 Powell
2,971,772 A  2/1961 Tantlinger et al.
(Continued)

FOREIGN PATENT DOCUMENTS

BR  0405014-2 A  6/2006
CN  204399316 U  6/2015
(Continued)

OTHER PUBLICATIONS

Mudri, Adrino, 2010: Electrifying! Beautiful, Innovative & Radiant, 2010, www.michelinchallengedesign.com/the-challenge-archives/2010-showcase-of-selected-entrants/road-runner-by-adriano-mudri-austria (Year: 2010).*

(Continued)

*Primary Examiner* — Brian L Swenson
(74) *Attorney, Agent, or Firm* — Snell & Wilmer L.L.P.

(57) ABSTRACT

Systems, methods, and devices for a vehicle door or window are disclosed herein. A vehicle includes a vehicle body and a cabin located within the body of the vehicle, wherein the cabin includes an interior that is configured to accommodate at least one person. The vehicle includes at least one seat located in the interior of the cabin that is configured for seating a user. The vehicle includes at least one door that provides ingress and egress of the interior of the cabin of the vehicle, and the at least one door is located with respect to the body such that the door opens to provide ingress and egress of the cabin from a backside of the seat. Further, the door may be a cargo door, which allows access to the cabin for placement of a load, such as a cargo load on a pallet.

20 Claims, 12 Drawing Sheets

Related U.S. Application Data is a continuation-in-part of application No. 15/396,209, filed on Dec. 30, 2016, now Pat. No. 10,077,084, which is a continuation-in-part of application No. 15/357,350, filed on Nov. 21, 2016, now Pat. No. 10,207,751.

(60) Provisional application No. 62/391,745, filed on May 9, 2016, provisional application No. 62/273,256, filed on Dec. 30, 2015, provisional application No. 62/391,745, filed on May 9, 2016.

(51) Int. Cl.
| | |
|---|---|
| *B60J 5/04* | (2006.01) |
| *B60L 50/60* | (2019.01) |
| *E05D 15/06* | (2006.01) |
| *B60R 3/00* | (2006.01) |

(52) U.S. Cl.
CPC .......... *B60R 3/005* (2013.01); *B62D 33/0612* (2013.01); *E05D 15/0604* (2013.01); *B60L 2200/36* (2013.01); *E05Y 2900/516* (2013.01)

(56) References Cited

U.S. PATENT DOCUMENTS

| | | |
|---|---|---|
| 2,998,264 A | 8/1961 | Stump |
| 3,007,716 A | 11/1961 | Maharick |
| 3,477,738 A | 11/1969 | Manning |
| 3,831,699 A | 8/1974 | Wolter |
| 4,174,855 A | 11/1979 | Vandenberg |
| 4,274,338 A | 6/1981 | Uozumi |
| 4,301,570 A | 11/1981 | Thomas |
| 4,313,619 A | 2/1982 | Hailer |
| 4,351,554 A | 9/1982 | Miller |
| 4,436,177 A | 3/1984 | Elliston |
| 4,813,704 A | 3/1989 | Smith |
| 4,813,736 A | 3/1989 | Schubert et al. |
| 4,932,716 A | 6/1990 | Marlowe et al. |
| 4,974,872 A | 12/1990 | Riese |
| 4,991,906 A | 2/1991 | Fingerle |
| 5,025,591 A | 6/1991 | DeLand et al. |
| 5,083,834 A | 1/1992 | Moffatt et al. |
| 5,201,379 A | 4/1993 | Penzotti et al. |
| 5,396,968 A | 3/1995 | Hasebe et al. |
| 5,413,462 A | 5/1995 | Alberni |
| 5,879,265 A | 3/1999 | Bek |
| 5,927,417 A * | 7/1999 | Brunner .................. B60K 6/40 180/65.6 |
| 6,179,312 B1 | 1/2001 | Paschke et al. |
| 6,213,531 B1 | 4/2001 | Corey et al. |
| 6,290,244 B1 | 9/2001 | Hosoya |
| 6,349,782 B1 | 2/2002 | Sekiya et al. |
| 6,357,769 B1 | 3/2002 | Omundson et al. |
| 6,428,027 B1 | 8/2002 | Stuart |
| 6,840,525 B1 | 1/2005 | Griffiths |
| 6,866,295 B2 | 3/2005 | Ziech et al. |
| 6,886,647 B1 | 5/2005 | Gotta |
| 6,904,717 B2 | 6/2005 | Clark et al. |
| 7,464,779 B2 | 12/2008 | Grabmaier et al. |
| 7,621,835 B2 | 11/2009 | Oshidari |
| 7,637,557 B2 | 12/2009 | Regnell et al. |
| 7,819,411 B2 | 10/2010 | Eshelman et al. |
| 7,971,890 B2 | 7/2011 | Richardson |
| 8,402,878 B2 | 3/2013 | Schreiner et al. |
| 8,402,879 B2 | 3/2013 | Lavergne et al. |
| 8,579,308 B2 | 11/2013 | Weeks et al. |
| 8,640,801 B2 | 2/2014 | Hennings et al. |
| 8,678,118 B2 | 3/2014 | Takenaka et al. |
| 8,960,341 B2 | 2/2015 | Weber |
| 9,108,688 B2 | 8/2015 | Stutz |
| 9,221,496 B2 | 12/2015 | Barr et al. |
| 9,266,423 B2 | 2/2016 | Hoshinoya et al. |
| 9,533,711 B2 | 1/2017 | Hirsch et al. |
| D814,979 S | 4/2018 | Cantuern et al. |
| 10,077,084 B2 | 9/2018 | Milton et al. |
| 2002/0163174 A1 | 11/2002 | Bell et al. |
| 2003/0064846 A1 | 4/2003 | Klemen et al. |
| 2003/0098564 A1 | 5/2003 | Vandenberg et al. |
| 2003/0122340 A1 | 7/2003 | Varela |
| 2004/0032149 A1 | 2/2004 | Ljungquist et al. |
| 2004/0150142 A1 | 8/2004 | Warinner et al. |
| 2004/0183271 A1 | 9/2004 | Galazin et al. |
| 2006/0192361 A1 | 8/2006 | Anderson et al. |
| 2006/0208477 A1 | 9/2006 | Eshelman et al. |
| 2007/0075566 A1 | 4/2007 | Lindemann et al. |
| 2007/0200390 A1 | 8/2007 | Lotarev et al. |
| 2007/0259747 A1 | 11/2007 | Thomas et al. |
| 2008/0179116 A1 | 7/2008 | Ikenoya et al. |
| 2008/0181515 A1 | 7/2008 | Kondo |
| 2008/0191515 A1 | 8/2008 | Hollenbeck |
| 2008/0231074 A1 | 9/2008 | Suzuki et al. |
| 2008/0315546 A1 | 12/2008 | Kucinski et al. |
| 2009/0014223 A1 | 1/2009 | Jones et al. |
| 2009/0057050 A1 | 3/2009 | Shiino et al. |
| 2009/0107050 A1 | 4/2009 | Suzuki |
| 2009/0224569 A1 | 9/2009 | Lagrut |
| 2010/0025131 A1 | 2/2010 | Gloceri et al. |
| 2010/0038877 A1 | 2/2010 | Cortez et al. |
| 2010/0060036 A1 | 3/2010 | Orii |
| 2010/0117318 A1 | 5/2010 | Grozev et al. |
| 2010/0122871 A1 | 5/2010 | Gottlinger |
| 2010/0276901 A1 | 11/2010 | Richardson et al. |
| 2011/0114398 A1 | 5/2011 | Bianco |
| 2011/0121606 A1 | 5/2011 | Engelbrecht |
| 2011/0214947 A1 | 9/2011 | Tuomas |
| 2013/0069391 A1 | 3/2013 | Hall et al. |
| 2013/0175779 A1 | 7/2013 | Kvien et al. |
| 2014/0182954 A1 | 7/2014 | Weber |
| 2014/0327220 A1 | 11/2014 | Holt et al. |
| 2015/0266373 A1 | 9/2015 | Wang |
| 2016/0076610 A1 | 3/2016 | White et al. |
| 2017/0197495 A1 | 7/2017 | Milton et al. |
| 2017/0240219 A1 | 8/2017 | Milton et al. |
| 2017/0320365 A1 | 11/2017 | Lorenz et al. |
| 2017/0320366 A1 | 11/2017 | Milton et al. |
| 2017/0320367 A1 | 11/2017 | Milton et al. |
| 2017/0320522 A1 | 11/2017 | Lorenz et al. |
| 2018/0237070 A1 | 8/2018 | Lorenz et al. |

FOREIGN PATENT DOCUMENTS

| | | |
|---|---|---|
| DE | 3136305 A1 | 3/1983 |
| DE | 102011084858 A1 | 4/2013 |
| DE | 19860230 A1 | 7/2015 |
| DE | 212013000235 U1 | 7/2015 |
| EP | 0931684 A1 | 7/1999 |
| EP | 0742113 B1 | 10/2001 |
| EP | 1724130 A1 | 11/2006 |
| EP | 1900554 B1 | 11/2011 |
| EP | 1628854 B1 | 11/2012 |
| JP | 06064419 A | 8/1994 |
| WO | 0123245 A1 | 4/2001 |
| WO | 0151300 A1 | 7/2001 |
| WO | 2015110965 A2 | 7/2015 |
| WO | 2017117572 A1 | 7/2017 |

OTHER PUBLICATIONS

PCT Written Opinion of the International Search Authority dated Jul. 20, 2017, Application No. PCT/US2017/031651, Applicant Bluegentech, LLC.

PCT International Search Report dated Jul. 17, 2017, Application No. PCT/US2017/031653, Applicant Bluegentech, LLC.

PCT Written Opinion of the International Search Authority dated Jul. 17, 2017, Application No. PCT/US2017/031653, Applicant Bluegentech, LLC.

U.S. Non-Final Office Action dated Apr. 2, 2018, U.S. Appl. No. 15/366,452.

U.S. Non-Final Office Action dated Apr. 3, 2018, U.S. Appl. No. 15/366,472.

(56) References Cited

OTHER PUBLICATIONS

Notice of Allowance dated Jun. 26, 2018, U.S. Appl. No. 15/498,557.
Extended European Search Report dated Aug. 25, 2017, Application No. 17169629.7-1755, Applicant ArvinMeritor Technology, LLC.
Extended European Search Report dated Sep. 7, 2017, Application No. 17169640.4-1755, Applicant, ArvinMeritor Technology, LLC.
U.S. Amendment Under 37 CFR 1.111 filed Oct. 1, 2018, U.S. Appl. No. 15/366,452.
U.S. Amendment Under 37 CFR 1.111 filed Sep. 4, 2018, U.S. Appl. No. 15/366,472.
Non-Final Office Action dated Oct. 18, 2018, U.S. Appl. No. 15/498,550.
U.S. Notice of Allowance dated Dec. 5, 2018, U.S. Appl. No. 15/498,557.
U.S. Final Office Action dated Dec. 11, 2018, U.S. Appl. No. 15/366,472.
Non-Final Office Action dated Dec. 14, 2018, U.S. Appl. No. 15/366,452.
USPTO, Non Final Office Action dated Oct. 6, 2017 in U.S. Appl. No. 15/357,350.
USPTO, Final Office Action dated Apr. 17, 2018 in U.S. Appl. No. 15/357,350.
USPTO, Notice of Allowance dated Jul. 27, 2018 in U.S. Appl. No. 15/357,350.
USPTO, Corrected Notice of Allowance dated Jan. 23, 2019 in U.S. Appl. No. 15/357,350.
USPTO, Non Final Office Action dated Aug. 3, 2017 in U.S. Appl. No. 15/396,209.
USPTO, Final Office Action dated Mar. 21, 2018 in U.S. Appl. No. 15/396,209.
USPTO, Advisory Action dated Jun. 19, 2018 in U.S. Appl. No. 15/396,209.
USPTO, Notice of Allowance dated Jul. 25, 2018 in U.S. Appl. No. 15/396,209.
USPTO, Non Final Office Action dated Oct. 12, 2018 in U.S. Appl. No. 15/889,159.
USPTO, Final Office Action dated Apr. 4, 2019 in U.S. Appl. No. 15/889,159.
USPTO, Advisory Action dated May 20, 2019 in U.S. Appl. No. 15/889,159.
USPTO, Non Final Office Action dated Sep. 30, 2018 in U.S. Appl. No. 15/889,159.
USPTO, Final Office Action dated Jan. 16, 2020 in U.S. Appl. No. 15/889,159.
USPTO, Notice of Allowance dated Feb. 12, 2020 in U.S. Appl. No. 15/889,159.
USPTO, Final Office Action dated Jun. 14, 2019 in U.S. Appl. No. 15/366,452.
USPTO, Notice of Allowance dated Aug. 27, 2019 in U.S. Appl. No. 15/366,452.
USPTO, Corrected Notice of Allowance dated Jan. 9, 2020 in U.S. Appl. No. 15/366,452.
USPTO, Corrected Notice of Allowance dated Feb. 12, 2020 in U.S. Appl. No. 15/366,452.
USPTO, Notice of Allowance dated Feb. 27, 2019 in U.S. Appl. No. 15/366,472.
USPTO, Corrected Notice of Allowance dated Feb. 19, 2019 in U.S. Appl. No. 15/498,557.
USPTO, Corrected Notice of Allowance dated Mar. 13, 2019 in U.S. Appl. No. 15/498,557.
USPTO, Notice of Allowance dated Apr. 19, 2019 in U.S. Appl. No. 15/498,550.
USPTO; Non Final Office Action dated Mar. 21, 2018 in U.S. Appl. No. 15/410,130.
USPTO; Final Office Action dated Sep. 13, 2018 in U.S. Appl. No. 15/410,130.
USPTO; Notice of Allowance dated Mar. 20, 2019 in U.S. Appl. No. 15/410,130.
USPTO; Non-Final Office Action dated May 19, 2020 in U.S. Appl. No. 16/359,886.
USPTO; Notice of Allowance dated Aug. 24, 2020 in U.S. Appl. No. 16/359,886.
USPTO; Notice of Allowance dated Dec. 9, 2020 in U.S. Appl. No. 16/412,748.
PCT International Search Report dated Sep. 6, 2017, Application No. PCT/US2017031056, Applicant Bluegentech, LLC.
PCT Written Opinion of the International Search Authority dated Sep. 6, 2017, Application No. PCT/US2017031056, Applicant Bluegentech, LLC.
PCT International Search Report dated Jul. 20, 2017, Application No. PCT/US2017/031651, Applicant Bluegentech, LLC.

* cited by examiner

CARGO DOOR FOR SEMI-TRUCK

Provisional application No. 62/391,745, filed on May 9, 2016, provisional application No. 62/273,256 filed on Dec. 30, 2015.

CROSS-REFERENCE TO RELATED APPLICATIONS

This application is a continuation-in-part of co-pending U.S. patent application Ser. No. 15/889,159 filed Feb. 5, 2018, now U.S. Patent Application Publication No. 2018-0222538, entitled "SYSTEMS, METHODS, AND DEVICES FOR AN AUTOMOBILE DOOR OR WINDOW." U.S. Ser. No. 15/889,159 is a continuation-in-part of U.S. patent application Ser. No. 15/396,209, filed Dec. 30, 2016, entitled "SYSTEMS, METHODS, AND DEVICES FOR AN AUTOMOBILE DOOR OR WINDOW," now U.S. Pat. No. 10,077,084. U.S. Ser. No. 15/396,209 claims priority to and the benefit of U.S. Provisional Application Ser. No. 62/273,256, filed Dec. 30, 2015, entitled "SYSTEMS, METHODS, AND DEVICES FOR AN AUTOMOBILE DOOR OR WINDOW," and U.S. Provisional Application Ser. No. 62/391,745, filed May 9, 2016, entitled "MOTOR GEARBOX ASSEMBLY." U.S. Ser. No. 15/396,209 is also a continuation-in-part of U.S. patent application Ser. No. 15/357,350, filed Nov. 21, 2016, entitled "MOTOR GEARBOX ASSEMBLY," now U.S. Pat. No. 10,207,751. U.S. patent application Ser. No. 15/357,350 claims priority to and the benefit of U.S. Provisional Application Ser. No. 62/391,745, filed May 9, 2016, entitled "MOTOR GEARBOX ASSEMBLY." The disclosures of all the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The disclosure relates generally to systems, methods, and devices for an automobile door or window, and more particularly relates to methods, systems, and devices for a cargo door on a semi-truck vehicle.

BACKGROUND

A variety of vehicle doors have been developed, described, and are widely known for providing ingress and egress of a vehicle. Vehicle doors, and particularly semi-truck doors, often provide immediate access to a seat located in the body of the vehicle. The doors are often hinged and require a user to enter or exit the vehicle at an angle that may be uncomfortable or even dangerous. Semi-truck doors and seats are located a significant distance above the ground and a user must be cautious to avoid injury when ascending the steps to the semi-truck door, opening the hinged semi-truck door, and sliding on to the seat while closing the hinged door. Accordingly, improved doors, particularly vehicle doors, remain desirable.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
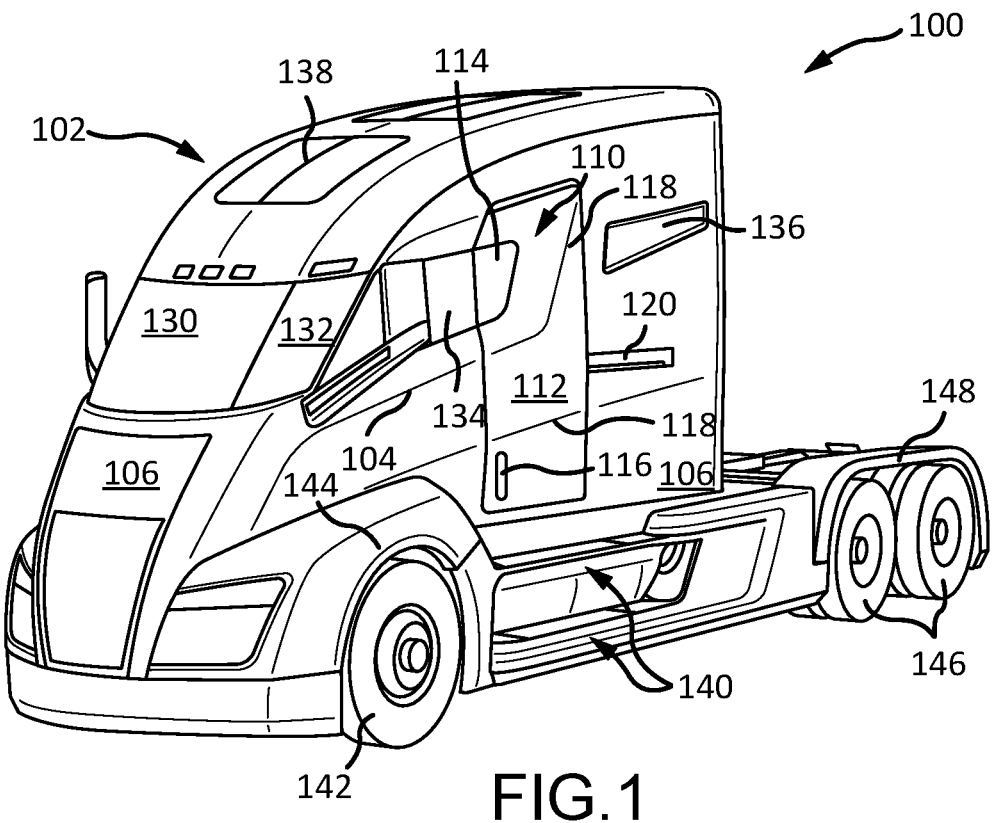
FIG. 1 is a front perspective view of a vehicle in accordance with the present disclosure.

Applicants have recognized that it is advantageous to provide a vehicle door, and particularly a semi-truck door, that allows a user to safely and comfortably enter and exit the vehicle. According to one aspect of the disclosure, a vehicle includes a vehicle body and a cabin located within the body of the vehicle. The cabin includes an interior that is configured to accommodate at least one person and the cabin includes at least one seat that is configured to seat at least one person. The vehicle includes at least one door that provides ingress and egress of the interior of the cabin of the vehicle, and the door opens into the cabin from a backside of the seat.

According to another aspect of the disclosure, an electric powered semi-truck includes a vehicle body, a cabin located within the vehicle body, at least one seat located in the interior of the cabin, and a sleeper portion located in the interior of the cabin. The semi-truck includes at least one sliding door that opens to provide ingress and egress of the interior of the cabin. A user may access the exterior of the sliding door by ascending at least one exterior step mounted to the exterior of the vehicle body at the door. The sliding door is located at approximately a midpoint of the vehicle body and the sliding door provides ingress and egress of the interior of the cabin from a backside of the at least one seat. The interior of the cabin includes a landing immediately adjacent to the sliding door wherein a user may stand at the landing and access the at least one seat or access the sleeper portion.

According to another aspect of the disclosure, a vehicle includes a vehicle body and a cabin located within the body of the vehicle. The cabin includes an interior that is configured to accommodate at least one person and the cabin includes at least one seat that is configured to seat at least one person. The vehicle includes a plurality of front wheels, and a majority of the seat is located at a position above the plurality of front wheels with respect to the body of the vehicle.

The disclosure relates generally to systems, methods, and devices for an automobile door or window. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Despite the existing systems, methods, and devices relating to automobile doors or windows, systems, methods, and devices for an automobile door or window are still being developed and are needed. As will be seen, the disclosure provides such methods, systems, and devices for doors and windows of an automobile, particularly for semi-trucks, in an effective and elegant manner.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting.

In describing the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

With reference to FIG. 1, in various embodiments, a vehicle 100 is an electric driven semi-truck having a vehicle body 102, a plurality of front wheels 142, a plurality of front wheel wells 144, a plurality of rear wheels 146, a plurality of rear wheel wells 148, and an electric motor and associated gear train at every front wheel 142. For example, vehicle 100 can comprise a sleeper cab configuration.

In various embodiments, the vehicle 100 includes an aerodynamic door 110 that includes an integrated door window 114 and a door handle 116. The door 110 includes an aerodynamic curvature 118 on the exterior door surface 112 that matches the curvature 104 of the vehicle 100. In an embodiment, the door 110 is a sliding door (as pictured in FIG. 1) and the door 110 slides on a track 120 that is integrated into the exterior 106 of the vehicle 100. The vehicle body 102 includes an aerodynamic front windshield 130 and panoramic windows 132 on either side of the front windshield 130. The vehicle body 102 includes at least one side window 134 on either side of the vehicle body 102, wherein an operator or passenger of the vehicle may open or close the side window 134. In an embodiment, a side window 134 connects and matches up with an integrated door window 114 when the door 110 is closed. The vehicle body 102 includes a cabin window 136 located in a rear portion of the vehicle body 102 with respect to the front windshield 130. The vehicle body 102 includes a sunroof 138 or moon roof integrated into the roof of the vehicle body 102. The vehicle body 102 further includes at least one step 140 mounted to the exterior of the vehicle body 102. The step 140 is located such that a user may ascend or descend the at least one step 140 when entering or exiting the vehicle through the door 110.

Vehicle 100 can, for example, include an electric motor and associated gear train (e.g., gear train with dual gear reduction) at every wheel 142, 146, which motors and gear trains may be grouped in pairs to form a motor gearbox assembly. In the embodiment illustrated in FIG. 1, the four rear wheels 146 each include a dual wheel pair (two wheels that rotate together). The electric motor may be configured to produce any suitable horsepower (HP), such as 100 to 400 HP, with six motors combined, may output about 2,000 HP and over 3,700 ft. lbs. of torque before gear reduction, and nearly 86,000 ft. lbs. of instant torque after gear reduction. The electric motors of the vehicle may produce superior horsepower, torque, acceleration, pulling and stopping power over other class 8 semi-trucks known in the art. It should be noted that the inclusion of an electric motor, and the elimination of a standard combustion engine, may allow for the reconfiguration of the layout and structure of a standard semi-truck as known in the art. The reconfiguration of many components of the vehicle body 102 can be advantageous to a user, as disclosed and described in the present application. The elimination of the combustion engine has, for example, provided for the at least one seat to be located at a position nearer the front of the vehicle body 102 than in a conventional semi-truck.

The aerodynamic door 110 is located to improve access and safety when entering or exiting the vehicle. In an embodiment, the door 110 is a sliding door as illustrated in FIG. 1, and in a further embodiment the door 110 is a hinged door. In an embodiment, the door 110 is located directly above a portion of the at least one step 140 such that a user may comfortably ascend or descend the step 140 when entering or exiting the vehicle through the door 110. The front of the vehicle body 102 is denoted by the front windshield 130, the door 110 is located to a backside of the at least one front wheel 142 and front wheel well 144. In an embodiment, the step 140 is connected to the front wheel well 144 and the door 110 is positioned immediately above the step 140 as illustrated in FIG. 1.

Figure 5:
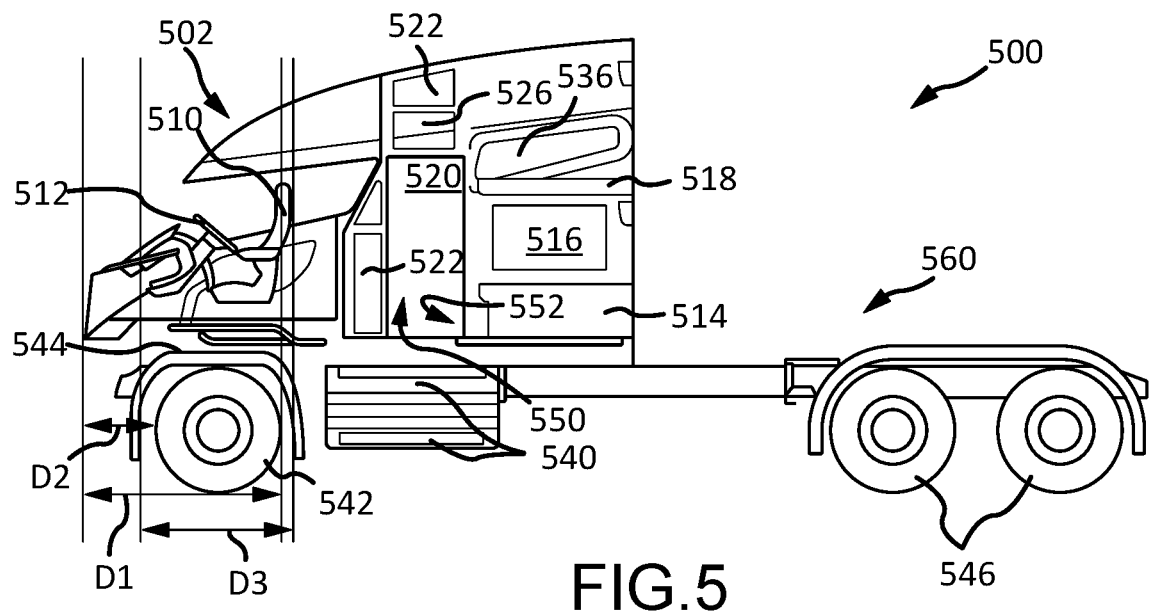
FIG. 5 is a side view of a vehicle showing interior components of the vehicle in accordance with the present disclosure.

The door 110 permits ingress and egress of the vehicle body 102 and the door 110 opens to a backside of at least one seat (see 510 in FIG. 5) in the cabin interior (see 550 in FIG. 5). In an embodiment, there is no additional door that provides immediate access to a seat. Stated another way, door 110 can comprise the foremost door providing ingress and egress of the vehicle body 102. In an embodiment, the door 110 provides ingress and egress from a backside of a seat and there is no other door on that side of the vehicle body 102. In various embodiments, the vehicle body 102 includes a single door at a driver's side of the vehicle or at a passenger's side of the vehicle. The vehicle body 102 can include, for example, two doors, wherein one door is located at a driver's side of the vehicle and an additional door is located at a passenger's side of the vehicle. In at least one embodiment, more than one door may be located on each side of the vehicle.

In various embodiments, the door 110 extends from a top of the step 140 to the top or roof of the vehicle body 102. In an embodiment, the door 110 provides an opening that is at least seven feet high. In an embodiment, the door 110 provides an opening that is at least six feet six inches high. In an embodiment, the door 110 provides an opening that is at least six feet high. In an embodiment, the door 110 provides an opening that is at least five feet high. In an embodiment, the door 110 is configured to permit at least one person to stand in the doorframe without bending down when the door 110 is opened.

The front of the vehicle body 102 is denoted by the front windshield 130 and a front side of the door 110 is located adjacent to a backside of the front wheel well 144. Alternatively, a portion of the door 110 is located above the front wheel well 144. In an embodiment, a front side of the door 110 is located at least six inches behind a backside of the front wheel well 144. In an embodiment, a front side of the door 110 is located at least twelve inches behind a backside of the front wheel well 144. In an embodiment, a front side of the door 110 is located at least eighteen inches behind a backside of the front wheel well 144. The width of the door 110 is configured to permit at least one person to stand in the doorframe while facing into the vehicle body 102 when the door 110 is opened. In an embodiment, the door 110 is at least two feet wide. In an embodiment, the door 110 is at least three feet wide. In an embodiment, the door 110 is at least four feet wide. In an embodiment, the door 110 is configured to permit at least one person to stand in the doorframe while holding a standard sized piece of luggage and facing into the vehicle body 102 when the door 110 is opened.

In an embodiment, the vehicle includes a drive motor attached to the door 110 that is configured to open or close the door. In an embodiment, the drive motor is engaged when a user engages the door handle 116. In an embodiment, the drive motor is automatically engaged when a sensor detects that a user is approaching the door 110. In an embodiment, the door 110 includes a peak load sensor that is configured to sense a threshold load when the door is closing. In such an embodiment, the vehicle 100 includes a control unit that reverses the direction of the door 110 and prohibits the door 110 from closing when the peak load sensor senses the threshold load. Such an embodiment may be beneficial to ensure safety when entering or exiting the vehicle such that the door will not close on a user and injure the user when the user is passing through the door 110.

It should be noted that the size and shape of the door 110 can have a significant impact on whether a person can safely and comfortably enter or exit the vehicle body 102. In an embodiment of the present disclosure, the size and shape of the door 110 is configured to permit a person to comfortably step into the vehicle body 102 as if stepping through a residential door. In an embodiment of the present disclosure, the door 110 is configured to permit a person to safely face into the vehicle body 102 when entering or exiting the vehicle body 102. The base of the door 110 may be located at a significant distance above the ground and it is beneficial to provide an ingress and egress of the vehicle body 102 that permits a person to comfortably and safely step into the vehicle body 102.

It should further be noted that the location of the door 110 can have a significant impact on whether a person can safely and comfortably enter or exit the vehicle body 102. In an embodiment of the present disclosure, the door is located at a backside of a seat such as the driver seat or the passenger seat. In an embodiment of the present disclosure, the door 110 opens to a landing (see 552 in FIG. 5) and a person may comfortably step into the vehicle body 102 while facing forward into the vehicle body 102. It should be noted that prior art vehicle doors are typically configured to provide immediate access to a vehicle seat and therefore require a user to enter the door at an angle. This can be particularly dangerous in the case of a semi-truck, wherein the door and the seat may be located at a significant distance above the ground and the vehicle body may be very large. Particularly in the case of semi-trucks, a user may have difficulty entering or exiting the semi-truck, and the user is at risk of injury while entering or exiting the semi-truck, when the user must slide into or out of a seat of the vehicle while ascending or descending a step on the exterior of the vehicle. It is therefore beneficial to provide a vehicle door, and particularly a semi-truck door, that permits a user to enter the vehicle without immediately sitting in a seat. In one embodiment, a width of the door is completely unobstructed by a seat or seat cushion. In one embodiment, a majority of the width of the door, such as at least 50% of the width of the door, is unobstructed by a seat or seat cushion. In one embodiment, a width of the door is completely unobstructed by a front edge of a seat. For example, a rear or back of a seat may slightly or partially obstruct the opening but a front or seat portion of the seat may not obstruct the opening. Eliminating or minimizing the amount of door opening that is obscured by a seat may allow a user to more easily enter or exit by walking into the vehicle 100 while keeping their body square or parallel with the opening. A seat or other object may be considered obscuring the opening if it is within three feet, two feet, one foot, or less of the opening of the door 110. In an embodiment, other objects such as tables, cabinets, or other structures may also not obscure the opening.

The door handle 116 is located on the door 110 to improve access and safety when engaging the door handle 116 to unlock and/or open the door 110. The door handle 116 may include any handle known in the art or later developed, including, for example, a lever type, a push button type, a lift back type, a pull type, or any other type of door handle 116. In an embodiment, the door 110 is a sliding door and the door handle 116 is located at a portion of the door 110 nearest the front windshield 130 of the vehicle 100. In an embodiment, the door 110 is a sliding door and the door handle 116 engages a drive motor to pull the door 110 open or closed when the door handle 116 is engaged by a user. In one embodiment, the door handle 116 is located in a bottom half, bottom third, and/or bottom quarter of the door.

The door curvature 118 is designed to increase the aerodynamic nature of the vehicle 100 and to decrease drag when the vehicle 100 is in motion. The door curvature 118 matches an overall curvature 104 of the vehicle 100 such that the door 110 is fully integrated into the exterior of the vehicle 100 when the door 110 is closed.

In the case of a sliding door 110, the sliding door track 120 connects with the door 110 and provides a path for the door 110 to slide when opening or closing. In an embodiment, the vehicle 100 includes an upper door track, a mid-track, and a lower door track. In an embodiment, the vehicle 100 includes a single sliding door track 120. The sliding door track 120 is configured to permit the door 110 to be smoothly opened without applying a significant amount of pressure.

The at least one exterior step 140 is mounted to or located on the exterior of the vehicle 100. The step 140 is constructed of any suitably rigid material and is configured to support the weight of at least one person. The at least one step 140 is located at the door 110 such that a user may ascend the step 140 and pass through the door 110 when opened. In an embodiment, the step 140 is a standard full-size step. In an embodiment, the at least one step 140 is fully rigid and cannot be collapsed. In an embodiment, the at least one step 140 includes joints and can be collapsed when not in use. In an embodiment, the vehicle body 102 includes a handle or similar point of leverage that is configured to provide stability to a user when the user is ascending the at least one step 140 or entering the vehicle 100 through the door 110. In an embodiment, the vehicle body 102 includes two handles configured to provide two points of leverage and assist a user when ascending the at least one step 140 or entering the vehicle 100 through the door 110. In such an embodiment, the user may ascend the at least one step, hold on to one or more of the handles, and pass through the door 110 facing forward into the cabin interior.

The aerodynamic vehicle body 102 is configured and formed to reduce drag when the vehicle 100 is in motion. In an embodiment, the vehicle 100 is an electric powered semi-truck and the vehicle does not include a combustion engine at the front side of the vehicle. Therefore, because the vehicle does not include a combustion engine, the vehicle body 102 may have a particularly aerodynamic shape. In an embodiment, a seat (see 510 in FIG. 5) is located above a front wheel well 144. In an embodiment, the front windshield 130 is located near the front-most point of the vehicle 100 and the front windshield 130 and panoramic windows 132 are configured to provide a user with a wide range of visibility. It should be appreciated that locating a seat 510 near the front of the vehicle body 102 and providing a panoramic view of the surroundings will increase safety and visibility when operating the vehicle.

Figure 2:
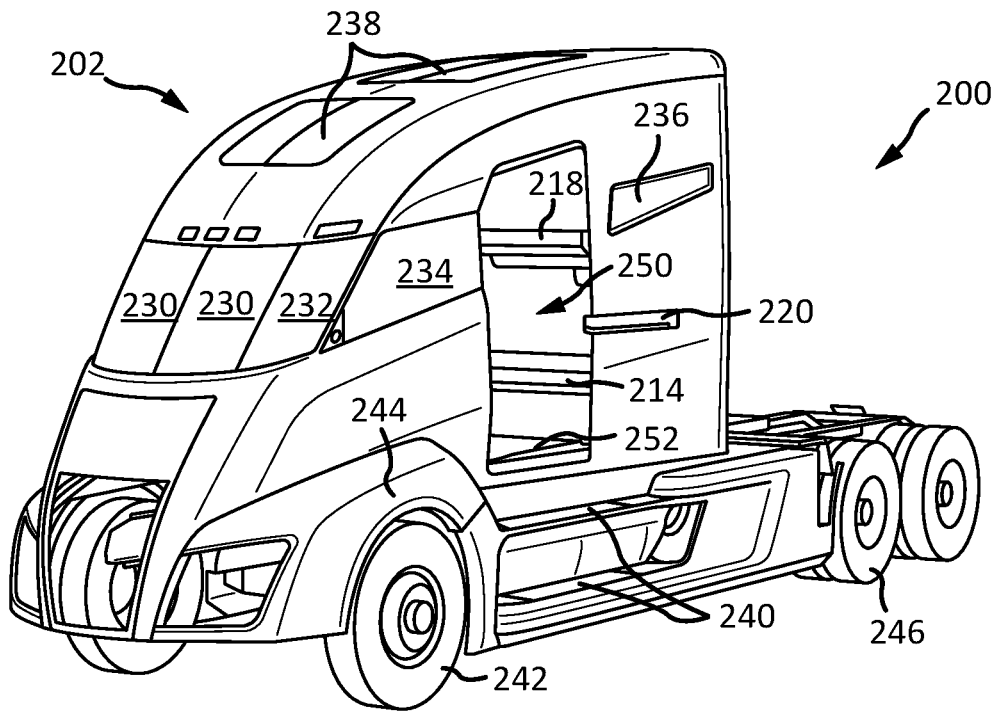
FIG. 2 is a front perspective view of a vehicle with a door removed in accordance with the present disclosure.

With reference to FIG. 2, a front perspective view of a vehicle 200 without a door is illustrated. The vehicle 200 includes a vehicle body 202 having a front windshield 230, a panoramic window 232, at least one side window 234, a cabin window 236, and a sunroof or moon roof 238. The vehicle 200 includes a plurality of front wheels 242 and front wheel wells 244 and a plurality of rear wheels 246. The vehicle includes at least one exterior step 240 leading to a door (see 110 in FIG. 1). In an embodiment, the door is a sliding door that is operated by sliding the door along a track 220 integrated into the exterior of the vehicle 200. The vehicle includes a cabin interior 250 and a landing 252 within the cabin interior 250. The cabin interior 250 includes a sleeper area having a lower sleeping space 214 and an upper sleeping space 218. FIG. 2 illustrates the vehicle 200 without a door (see 110 in FIG. 1) such that a portion of the cabin interior 250 may be shown.

In an embodiment, the landing 252 is an open space and it includes a flat horizontal landing 252. Where the front windshield 230 denotes the front of the vehicle 200, the landing 252 is located at a backside of a seat (see 510 in FIG. 5). In an embodiment, the landing 252 is located behind a front wheel well 244. In an embodiment, the landing 252 is located in front of a sleeping space 214, 218. In an embodiment, the landing 252 extends from the door opening to a wall directly opposite the door opening. In an embodiment, the vehicle body 202 includes two doors 110 directly opposite from one another, and the landing 252 extends from one door opening to the other door opening.

In an embodiment, the size and shape of the landing 252 is configured to accommodate at least one person. In an embodiment, the landing 252 has a vertical ceiling height that is configured to accommodate a person without the need for the person to bend over. In an embodiment, the landing 252 has a vertical ceiling height of at least eight feet. In an embodiment, the landing 252 has a vertical ceiling height of at least seven feet. In an embodiment, the landing 252 has a vertical ceiling height of at least six feet six inches. In an embodiment, the landing 252 has a vertical ceiling height of at least six feet. In an embodiment, the landing 252 has a vertical ceiling height of at least five feet six inches.

Figure 3:
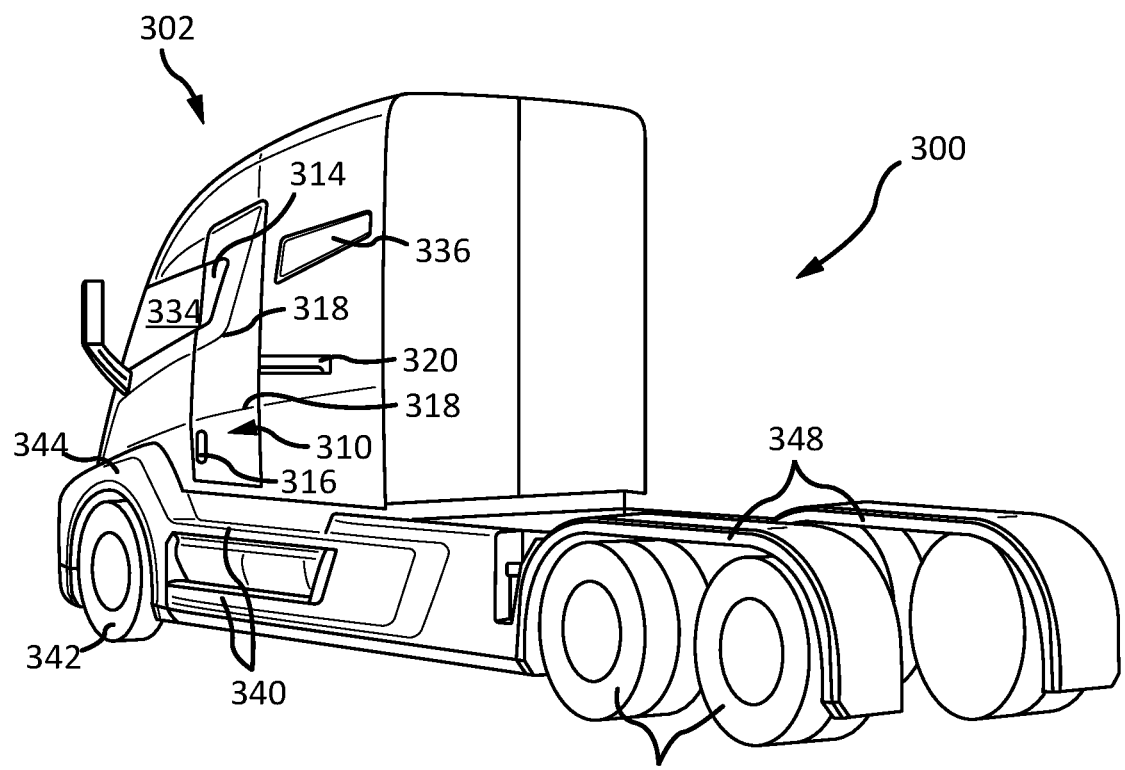
FIG. 3 is a rear perspective view of a vehicle in accordance with the present disclosure.

Referring now to FIG. 3, a rear perspective view of a vehicle 300 made in accordance with the teachings and principles of the disclosure is illustrated. The vehicle 300 includes a vehicle body 302 having at least one side window 334 and at least one cabin window 336. The vehicle 300 includes a plurality of front wheels 342 and front wheel wells 344 and a plurality of rear wheels 346 and rear wheel wells 348. The vehicle 300 includes at least one step 340 leading to a vehicle door 310. The door 310 includes a handle 316, an aerodynamic door curvature 318, and an integrated door window 314. In an embodiment, the door 310 is a sliding door and it is opened and closed by sliding on a track 320.

Figure 4:
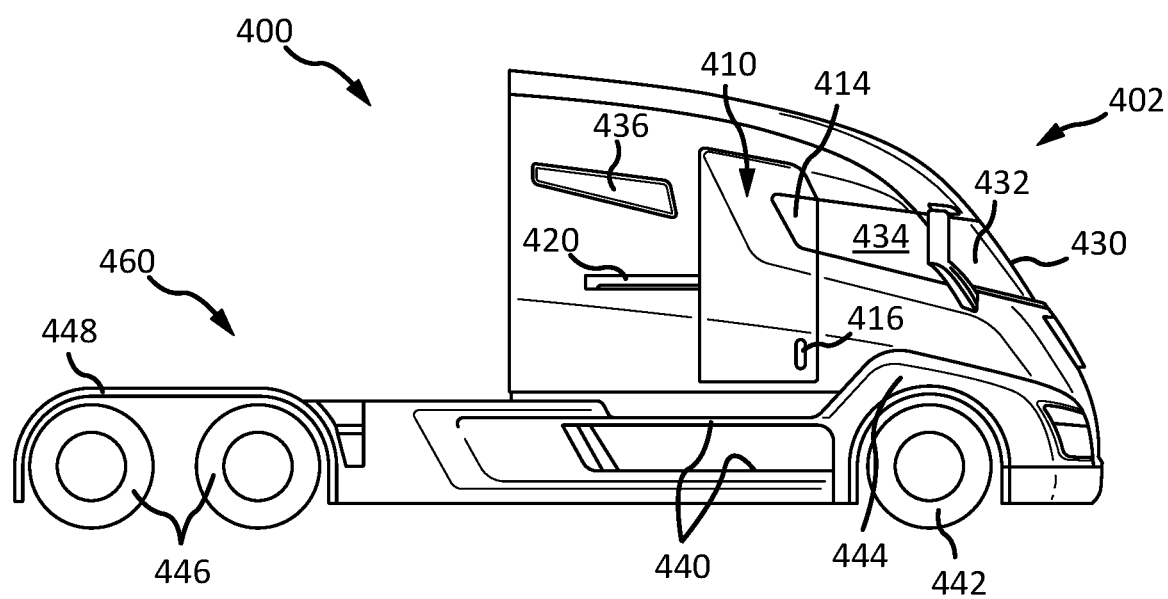
FIG. 4 is a side view of a vehicle in accordance with the present disclosure.

Referring now to FIG. 4, a side view of a vehicle 400 made in accordance with the teachings and principles of the disclosure is illustrated. In an embodiment, the vehicle 400 is a semi-truck with a semi-trailer 460 and a vehicle body 402. The vehicle 400 includes a plurality of front wheels 442, front wheel wells 444, rear wheels 446, and rear wheel wells 448. The vehicle body 402 includes a front windshield 430, a panoramic window 432, at least one side window 434 and a cabin window 436. The vehicle body 402 includes a vehicle door 410 having a handle 416 and an integrated door window 414. In an embodiment, the door 410 is a sliding door and the vehicle body 402 includes a sliding door track 420. The vehicle body 402 includes at least one step 440 located at the base of the door 410 that may permit a user to access the door 410 and comfortably enter or exit the vehicle body 402.

Referring now to FIG. 5, a side view of a vehicle 500 showing interior components of the vehicle 500 is shown. As illustrated in FIG. 5, the vehicle 500 is a semi-truck having a vehicle body 502 and a semi-trailer 560. The vehicle 500 includes a plurality of front wheels 542 and a plurality of rear wheels 546. The vehicle 500 includes at least one seat 510 wherein a driver or a passenger of the vehicle may sit. In an embodiment, the vehicle body 502 includes only a driver seat 510 and in a further embodiment the vehicle body 502 includes a driver seat 510 and a passenger seat. The vehicle body 502 includes a steering wheel 512 positioned in front of a driver seat 510.

The vehicle includes at least one step 540 mounted to the exterior of the vehicle body 502 and wherein a user may ascend or descend the at least one step when entering or exiting the vehicle body 502 through the door (see 110 in FIG. 1). The vehicle body 502 includes a cabin interior 550 having a landing 552. FIG. 5 further illustrates distance markings D1 and D2 that are further disclosed and discussed with respect to FIG. 7. D1 illustrates a distance from a front end of the vehicle body 502 to a rear most location on the front wheels 542. D2 illustrates a distance from a front end of the vehicle body 502 to a front most location on the front wheels 542. The first distance D1 is greater than the second distance D2. D3 illustrates a distance or horizontal distance between a front most portion and a rear most portion of the front wheel well 544. In an embodiment, the entirety of the at least one seat is located within the horizontal distance D3 of the front wheel wells 544.

The vehicle cabin interior 550 includes a number of features to provide comfort and convenience to an operator or passenger of the vehicle 500. In an embodiment, the cabin interior 550 includes a cooling appliance 520 and a microwave oven 526 or other small appliance. The cabin interior includes a plurality of storage spaces 522. The cabin interior 550 includes a lower sleeping space 514 and an upper sleeping space 518. The cabin interior includes a display 516 such as a television, monitor, touch screen monitor, computer, and the like. The cabin interior 550 includes at least one cabin window 536.

The cooling appliance 520 includes any of a powered refrigerator, a powered freezer, a powered refrigerator and freezer combination, or a non-powered version of any of the aforementioned cooling appliances. In an embodiment, the cooling appliance 520 is located opposite the door (see 110 in FIG. 1). The cooling appliance 520 may be mounted to a wall of the vehicle body 502, and/or it may be mounted to the landing 552, or it may be freestanding. In an embodiment, the cooling appliance 520 is powered by the ESS of the vehicle 500. In an embodiment, the cooling appliance 520 includes an internal volume of at least five cubic feet. In an embodiment, the cooling appliance 520 includes an internal volume of at least ten cubic feet. In an embodiment, the cooling appliance 520 includes an internal volume of at least fifteen cubic feet. In an embodiment, the cooling appliance 520 includes an internal volume of at least twenty cubic feet.

In an embodiment, the microwave oven 526 is located opposite the door (see 110 in FIG. 1) and is mounted above the cooling appliance 520. It should be appreciated that the microwave oven 526 may be replaced with any other suitable appliance or may be replaced with a storage space without departing from the spirit and scope of the disclosure. In an embodiment, the microwave oven 526 is powered by the ESS of the vehicle 500.

In an embodiment, a plurality of storage spaces 522 are built in to the cabin interior 550. It should be appreciated that the cabin interior 550 may include a storage space 522 located in any suitable place. A storage space 522 may be located, for example, underneath the lower sleeping space 514 or above the upper sleeping space 518, underneath the landing 552 flooring, on a backside of a seat 510, above the microwave oven 526, to the side of the cooling appliance 520, or any other suitable location.

In an embodiment, the display 516 is mounted to a wall of the cabin interior 550 opposite the door (see 110 in FIG. 1) and between the lower sleeping space 514 and the upper sleeping space 518. The display 516 may include any display known in the art or later discovered such as, for example, a light-emitting diode display, an electroluminescent display, an electronic paper display, a plasma display panel, a liquid crystal display, an organic light-emitting diode display, and the like. The display 516 may include a television, a computer monitor, a touchscreen display, or any other suitable display. The display 516 may be in electronic communication with a network interface, a computing device, or any other suitable appliance. In an embodiment, the display is powered by the ESS of the vehicle 500.

In an embodiment, the lower sleeping space 514 and the upper sleeping space 518 are located farther from the front of the vehicle (see 130 in FIG. 1) than the door (see 110 in FIG. 1). That is, the lower sleeping space 514 and the upper sleeping space 518 are located at the backside portion of the cabin interior 550. Each of the sleeping spaces 514, 518 may be mounted to at least one wall of the vehicle 500 and the sleeping spaces 514, 518 may be hinged on one side such that the sleeping space 514, 518 may be hinged and stored away when not in use. Each of the sleeping spaces 514, 518 are accessible from the landing 552. In an embodiment, each of the sleeping spaces 514, 518 includes a mattress. In an embodiment, at least one of the sleeping spaces 514, 518 includes a standard sized mattress in a twin size, a full size, or a queen size. In an embodiment, at least one of the sleeping spaces 514, 518 includes a non-standard sized mattress.

Figure 6:
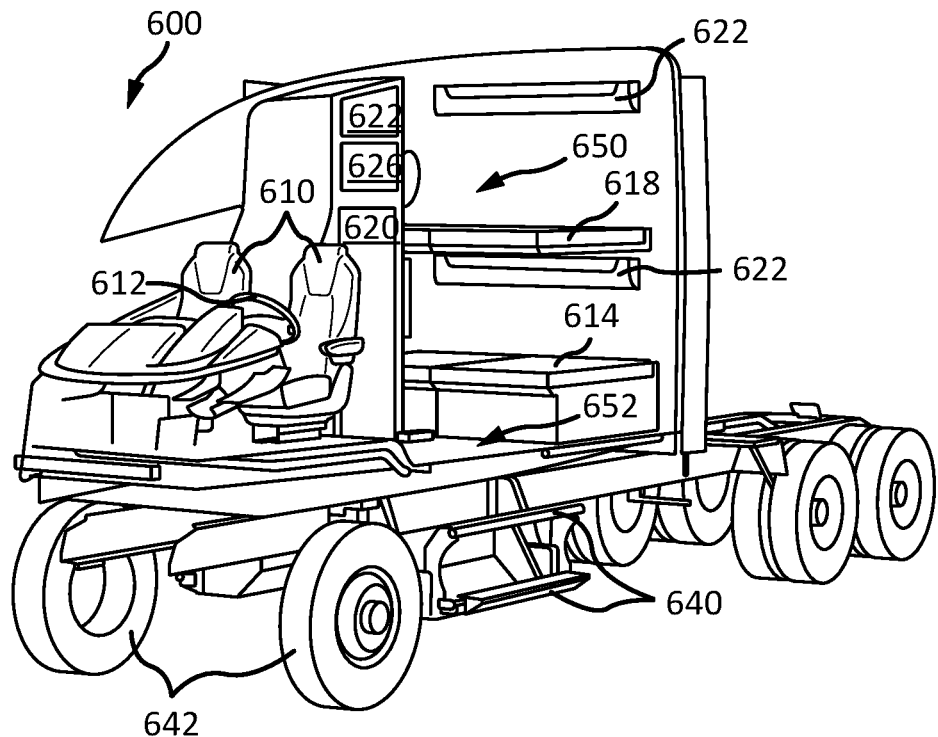
FIG. 6 is a front perspective view of a vehicle showing interior components of the vehicle in accordance with the present disclosure.

Referring now to FIG. 6, a front perspective view of a vehicle 600 illustrating interior components of the vehicle 600 is shown. The vehicle 600 includes at least one seat 610 and a steering wheel 612. The vehicle 600 includes a cabin interior 650. The cabin interior 650 includes a cooling appliance 620, a microwave oven 626 or other small appliance, and a plurality of storage spaces 622. The cabin interior 650 includes a lower sleeping space 614 and an upper sleeping space 618 that form a sleeper in the cabin interior 650. The vehicle 600 includes front wheels 642. The vehicle 600 includes at least one step 640 mounted to the exterior of the vehicle, wherein the at least one step 640 permits a user to safely enter or exit the vehicle 600 through a door (see 110 in FIG. 1). The cabin interior 650 includes a landing 652 adjacent to the door 110 that is configured to accommodate at least one person.

As illustrated in FIG. 6, the cooling appliance 620 and microwave oven 626 extend into the cabin interior 650. In an embodiment, the landing 652 extends from the door 110 to the cooling appliance 620 in one direction and from the lower sleeping space 614 to the backside of the at least one seat 610 in the perpendicular direction. In an embodiment, the landing 652 is of a sufficient size to comfortably fit at least one person. In an embodiment, there is sufficient vertical space from the landing 652 to the ceiling of the cabin interior 650 for a user to stand in the landing 652 without the need to bend over.

The cabin interior 650 is configured to permit a person to enter the cabin interior 650 through a door 110 and comfortably stand at the landing 652. A person may access either of the lower sleeping space 614 or the upper sleeping space 618 from the landing 652. A person may comfortably access and open either of the cooling appliance 620 and the microwave oven 626 while standing at the landing 652. A person may access the at least one seat 610 from the landing. In an embodiment, as illustrated in FIG. 6, the vehicle 600 includes two seats 610 and a user may access either of the two seats from the landing 652 by passing between the two seats 610.

Figure 7:
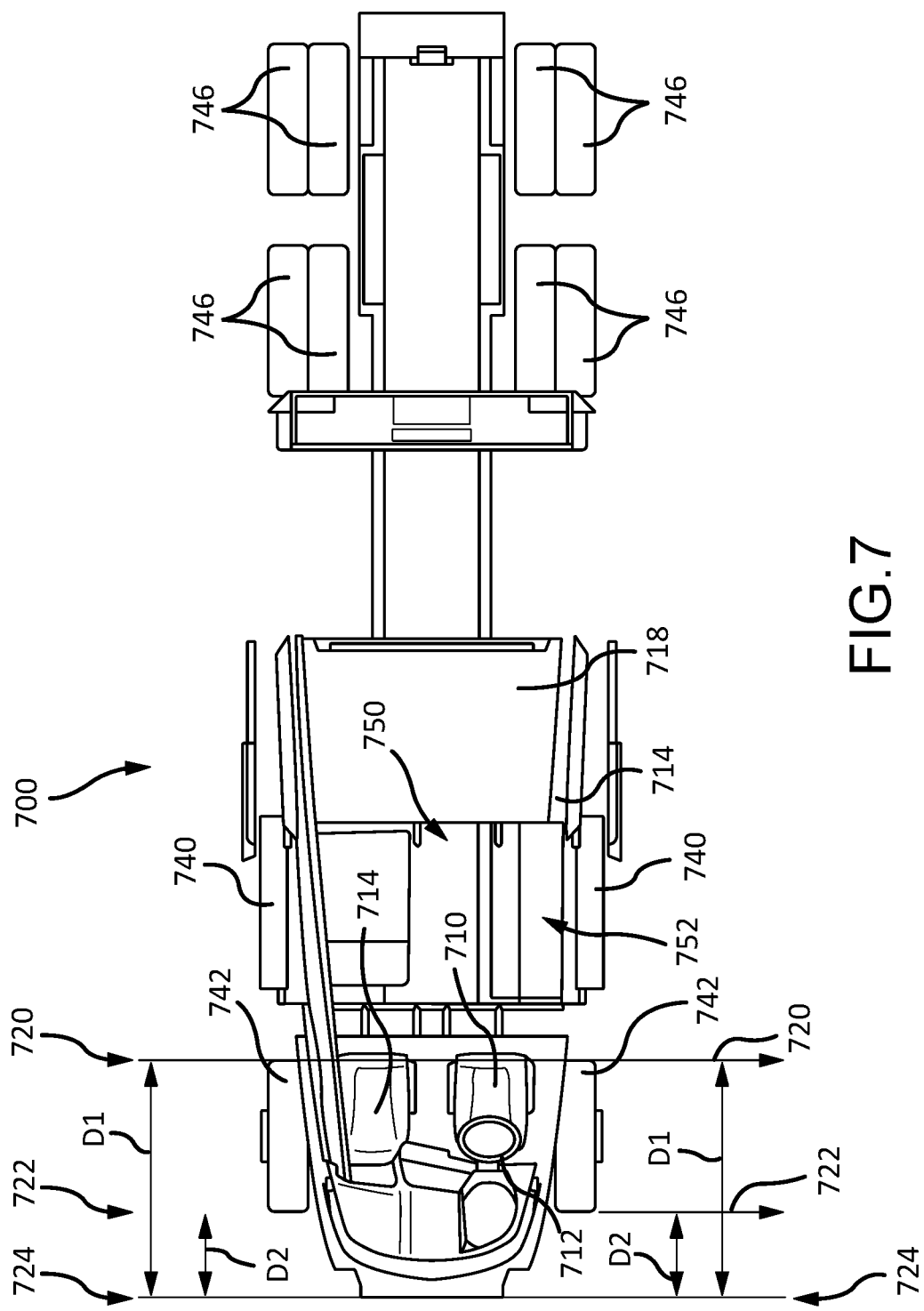
FIG. 7 is a top view of a vehicle showing interior components of the vehicle in accordance with the present disclosure.

Referring now to FIG. 7, an aerial view of a vehicle 700 showing interior components of the vehicle 700 is shown. The vehicle 700 includes a plurality of front wheels 742 and a plurality of rear wheels 746. The vehicle includes at least one seat and may include a driver's side seat 710 and a passenger's side seat 714. The vehicle includes a steering wheel 712 positioned in front of the driver's side seat 710. The vehicle includes at least one step 740 mounted to the exterior of the vehicle 700. The at least one step 740 may provide access to a door (see 110 in FIG. 1) or it may not lead to a door. The vehicle 700 includes a cabin interior 750 having a landing 752 and a number of features to provide comfort and convenience to a user. The cabin interior 750 includes a sleeper including a lower sleeping space 714 and an upper sleeping space 718.

The vehicle 700 includes a front end of the body 724. The front wheels 742 include a first rear most location 720 that is a first distance D1 from the front end of the body 724. The front wheels 742 include a second front most location 722 that is a second distance D2 from the front end of the body 724. The first distance D1 is greater than the second distance D2. As illustrated in FIG. 1, the majority of at least one of the seats 710, 714 is located within the first distance D1 of the front wheels 742. As discussed above, this placement of the at least one seat 710, 714 is made possible by the vehicle 700 being an electric powered vehicle 700 and not including a combustion engine. A typical semi-truck in the prior art having a combustion engine does not include space for at least one seat to be located in a position above a front wheel relative to the body of the vehicle. In an embodiment, the steering wheel 712, the at least one seat 710, 714, and the controls necessary for operating the vehicle are located in a position proximal to the front of the body 724 where a combustion engine would typically be located in a prior art combustion-based semi-truck. Because an embodiment of the present disclosure is an electric powered semi-truck without a combustion engine, the at least one seat 710, 714 can be located at a first distance D1 of the front wheels 742 relative to the front of the body 724.

In one embodiment, a foremost portion of a door is behind the first distance D1. For example, all portions of an opening revealed by a door may be greater than the first distance D1 from the front of the vehicle. Thus, the door may provide access to a cabin behind a seat, such as a driver's seat or driver compartment. In one embodiment, all portions of a driver's seat, when in a driving position, are within the first distance D1 of the front of the vehicle. In one embodiment, the foremost part of a door may be located further than the second distance D2 and/or first distance D1 from the front of the vehicle.

Figure 8:
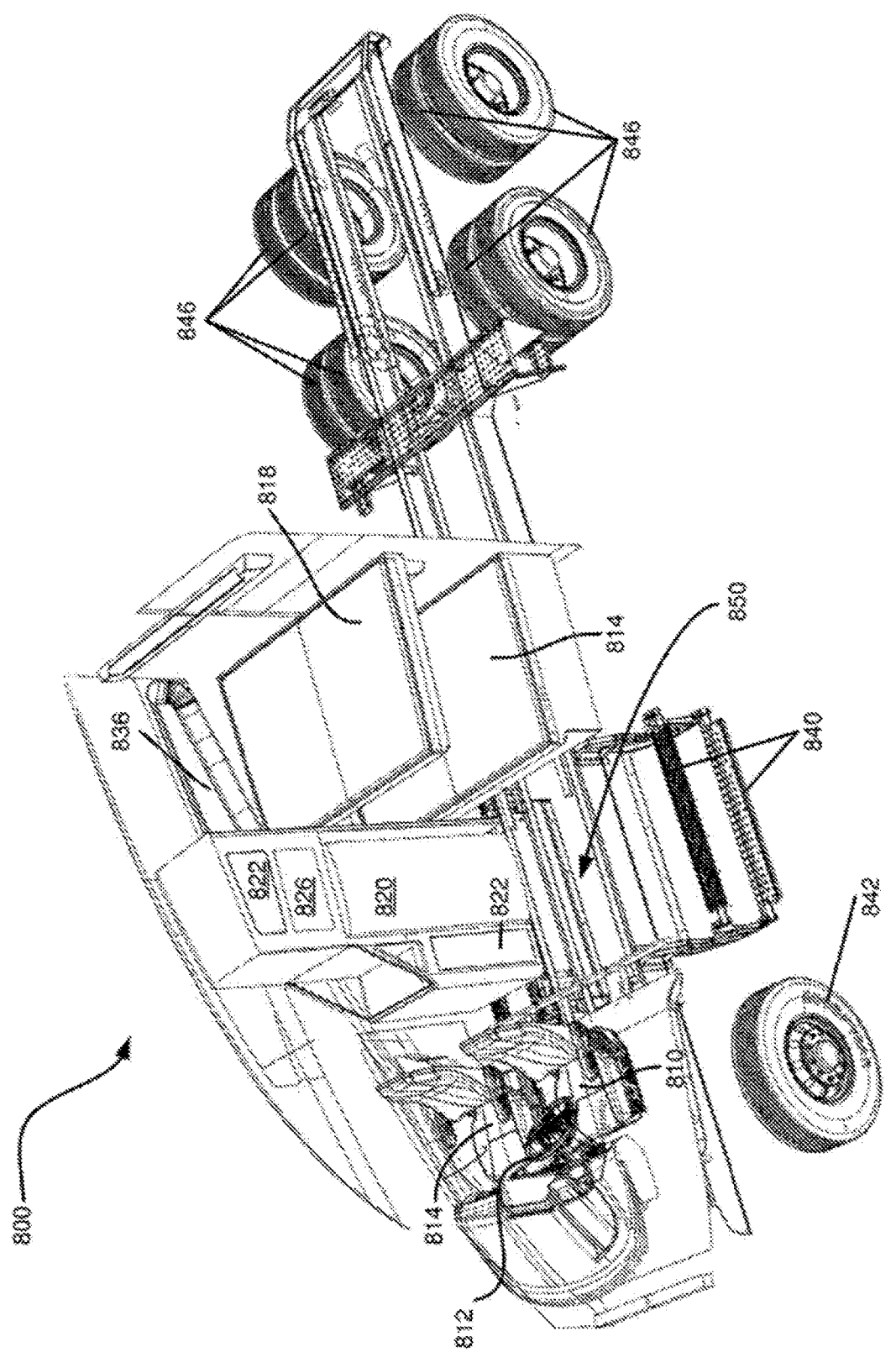
FIG. 8 is a perspective view of a vehicle in accordance with the present disclosure.

Referring now to FIG. 8, an aerial perspective view of a vehicle 800 showing interior components of the vehicle 800 is shown. The vehicle 800 includes an interior cab 850 having a number of features to provide comfort and convenience to a user. In an implementation, the interior cab 850 includes a sleeper consisting of a lower sleeping space 814 and an upper sleeping space 818. In an implementation, the interior cab 850 includes a cooling appliance 820, a microwave oven 826, and a plurality of storage space 822. The interior cab 850 includes a cabin window 836 and may include at least one sunroof or moon roof (see 138 in FIG. 1). The vehicle includes a plurality of front wheels 842 and a plurality of rear wheels 846. The vehicle includes at least one seat 810, 814 and may include a driver's side seat 810 and a passenger's side seat 814. The vehicle includes a steering wheel 812 positioned in front of the driver's side seat 810.

Figure 9:
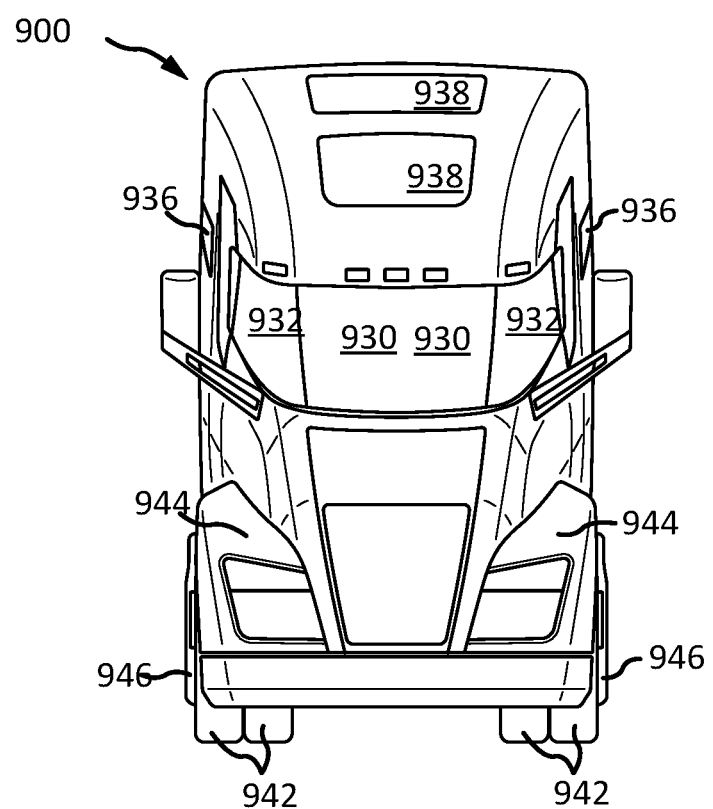
FIG. 9 is a front view of a vehicle in accordance with the present disclosure.

Referring now to FIG. 9, a front view of a vehicle 900 made in accordance with the principles and teachings of the disclosure is shown. The vehicle 900 includes a front windshield 930, at least one panoramic window 932, and at least one cabin window 936, and at least one roof window 938. The vehicle 900 includes a plurality of front wheels 942, a plurality of front wheel wells 944, and a plurality of rear wheels 946.

Referring to FIGS. 10A-10F, a vehicle 1000 in accordance with the present disclosure is illustrated. Vehicle 1000 comprises a front windshield 1030, a panoramic window 1032, and at least one side window 1034. Additionally, vehicle 1000 comprises a cargo door 1010 positioned rearward of the front wheel 1042. For example, cargo door 1010 can be positioned at least six inches behind a backside (i.e., a rearmost portion of) of front wheel 1042, or further, at least twelve inches behind the backside of front wheel 1042, or still further, at least eighteen inches behind the backside of front wheel 1042. In various embodiments, as illustrated, cargo door 1010 can be positioned on the driver's side of vehicle 1000. In other embodiments, cargo door 1010 can be positioned on the passenger's side of vehicle 1000. In yet other embodiments, two cargo doors 1010 can be positioned opposite of one another (i.e., one each on the passenger's side and the driver's side) of vehicle 1000. Moreover, in some embodiments vehicle 1000 may be configured with zero, one, or multiple cargo doors 1010 on a particular side of vehicle 1000 (i.e., on the passenger's side) and/or with zero, one, or multiple cargo doors on another side of vehicle 1000 (i.e., on the driver's side, a rear-facing side, and/or the like).

Figure 10A:
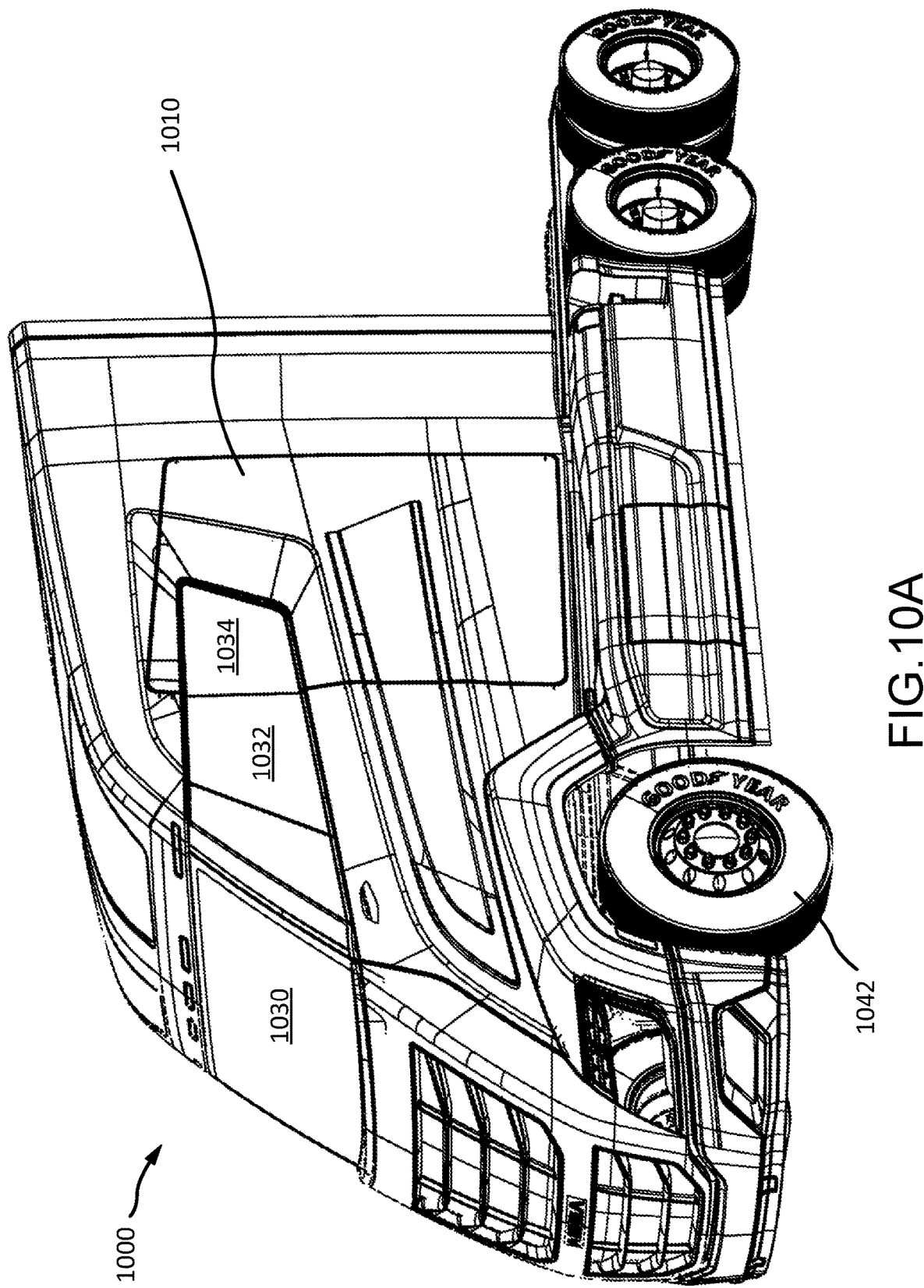
FIG. 10A is a perspective view of a vehicle in accordance with the present disclosure.
Figure 10B:
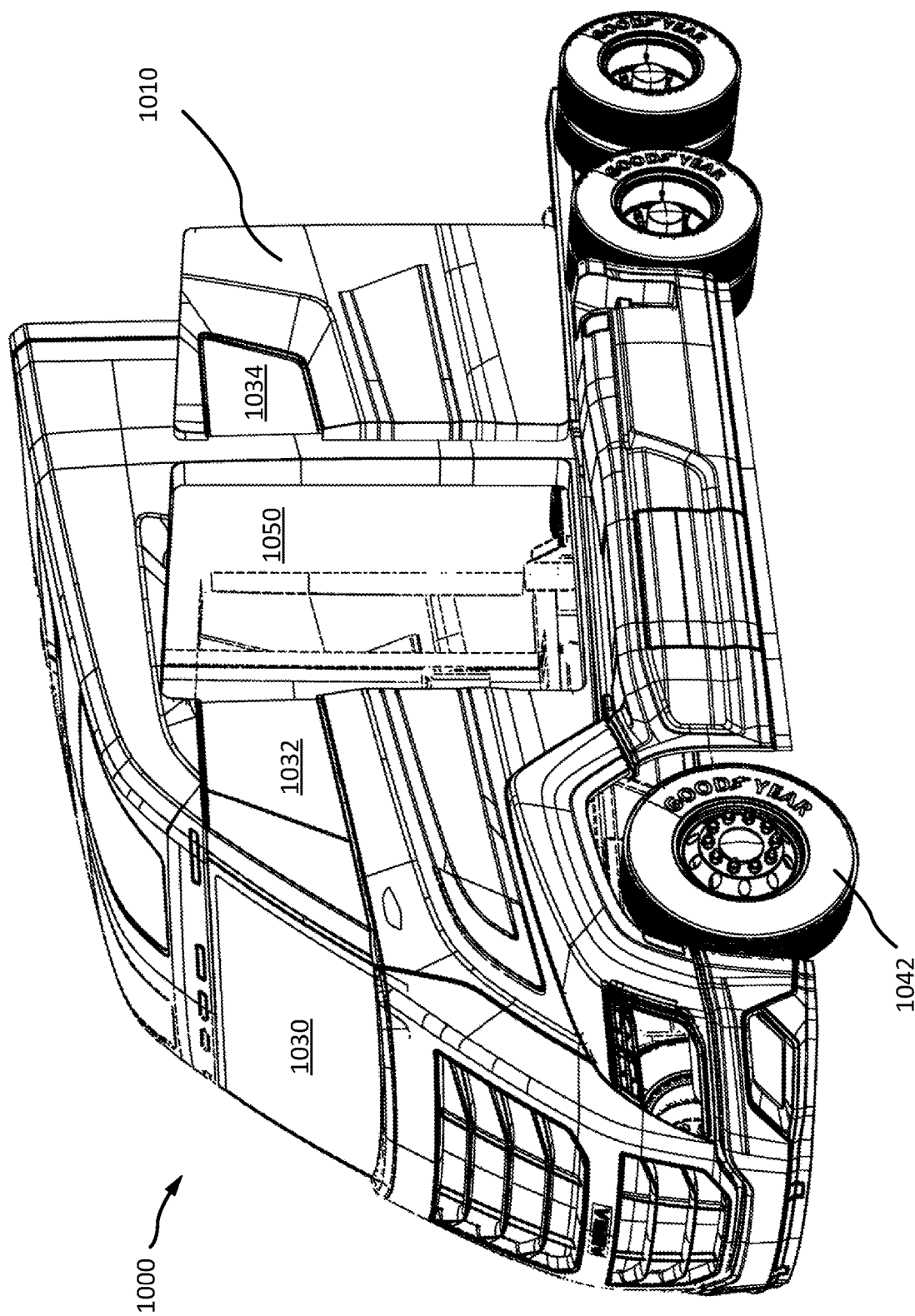
FIG. 10B is a perspective view of the vehicle of FIG. 10A with a side cargo door open.
Figure 10C:
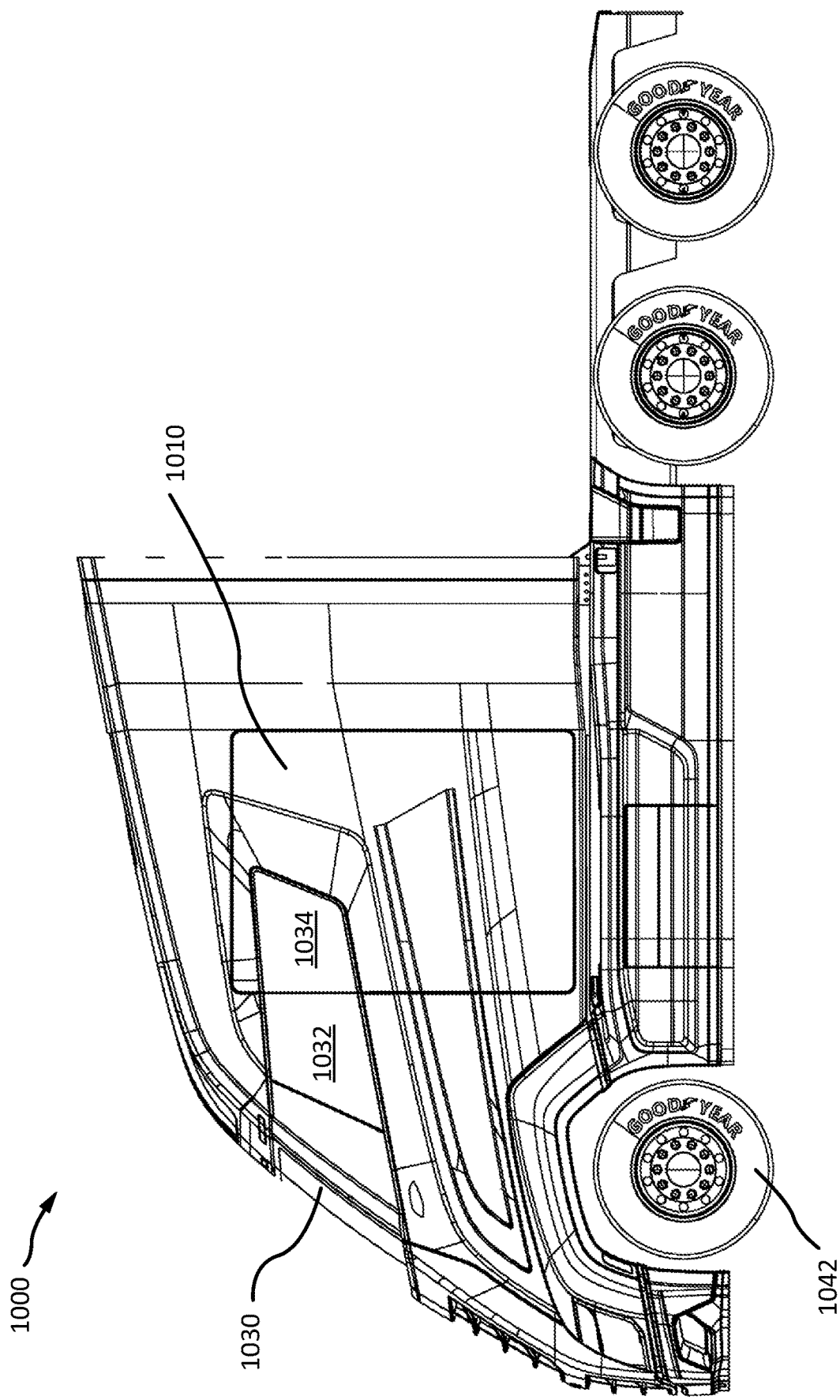
FIG. 10C is a side view of a vehicle in accordance with the present disclosure.
Figure 10D:
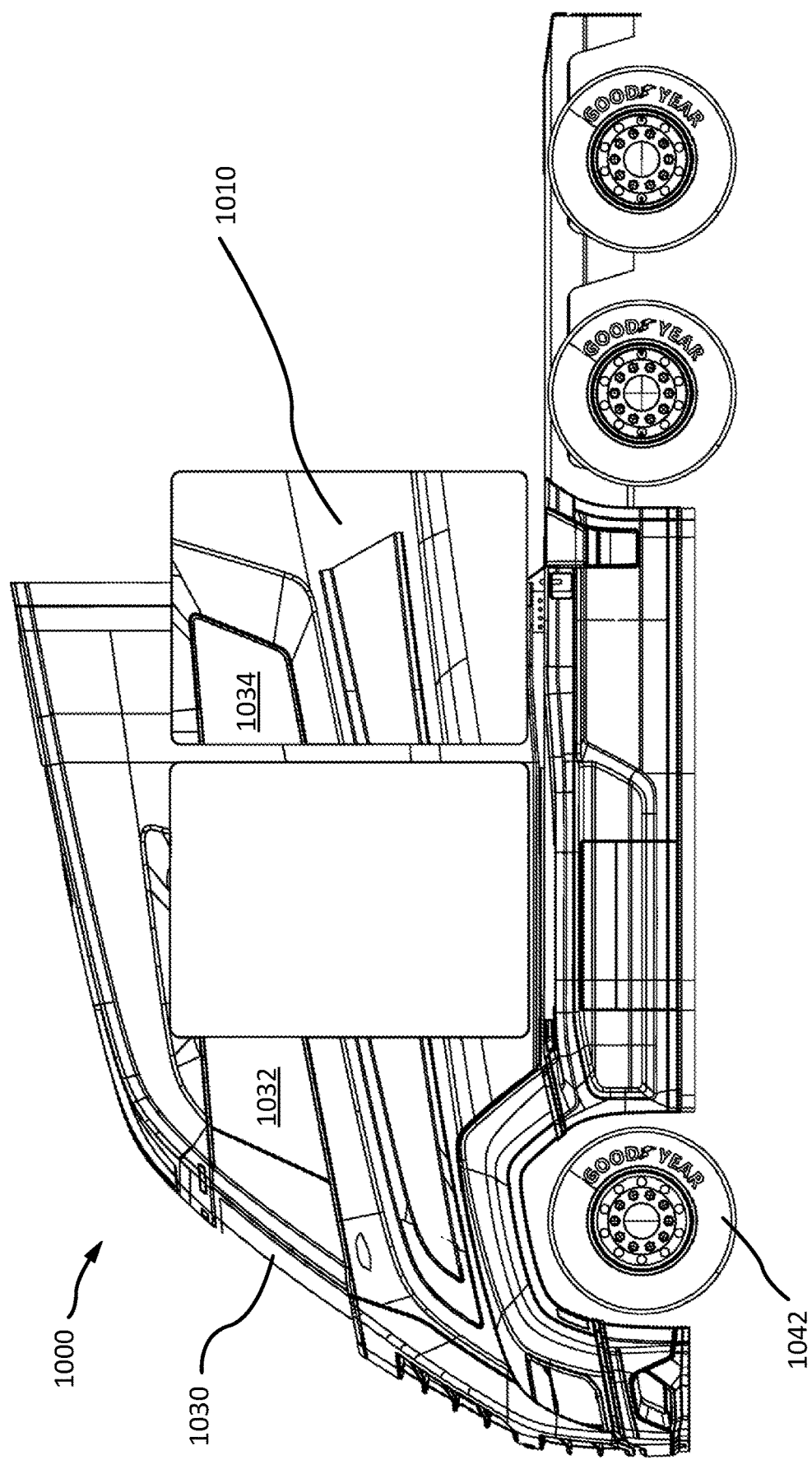
FIG. 10D is a side view of the vehicle of FIG. 10C with a side cargo door open.
Figure 10E:
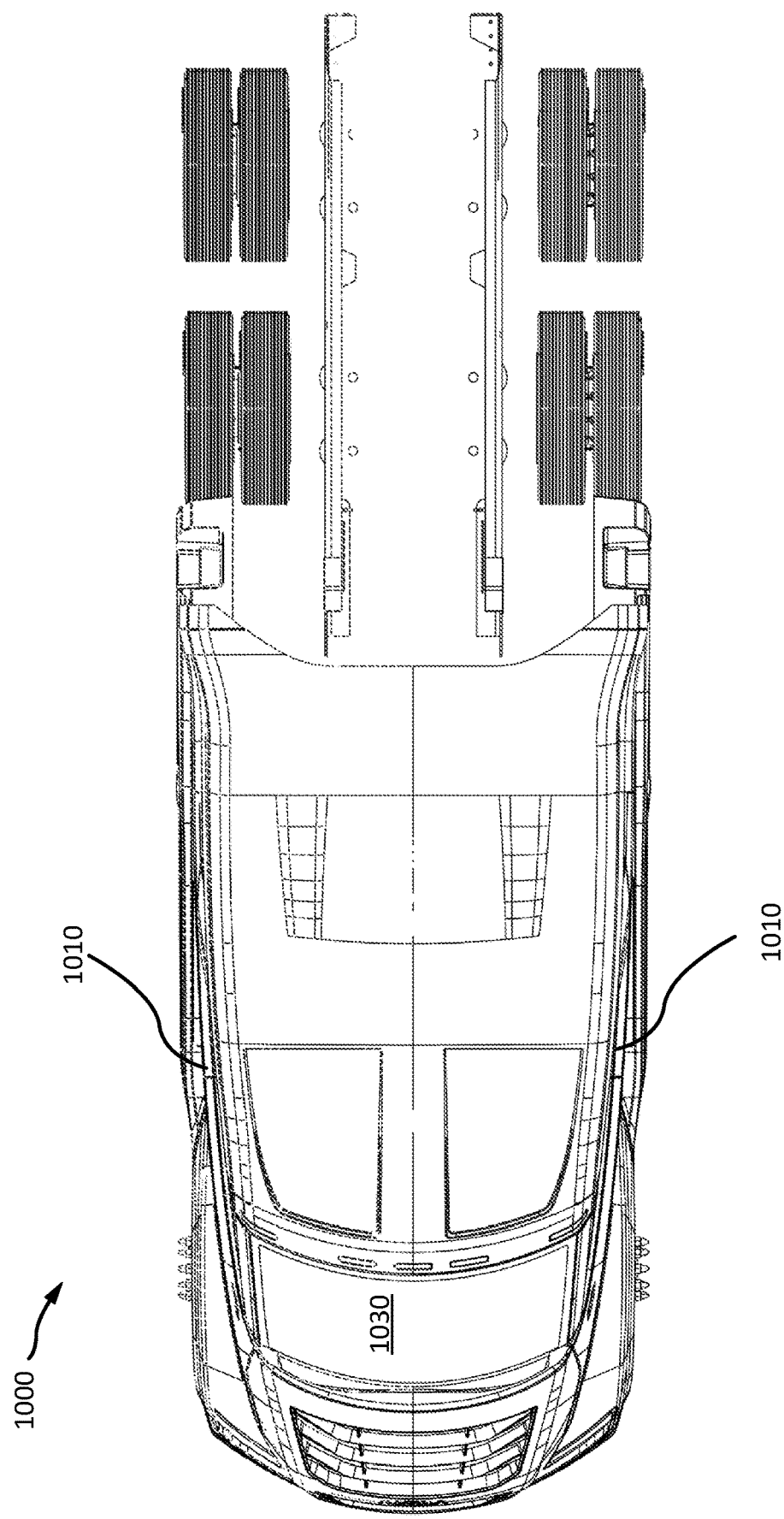
FIG. 10E is a top view of a vehicle in accordance with the present disclosure.
Figure 10F:
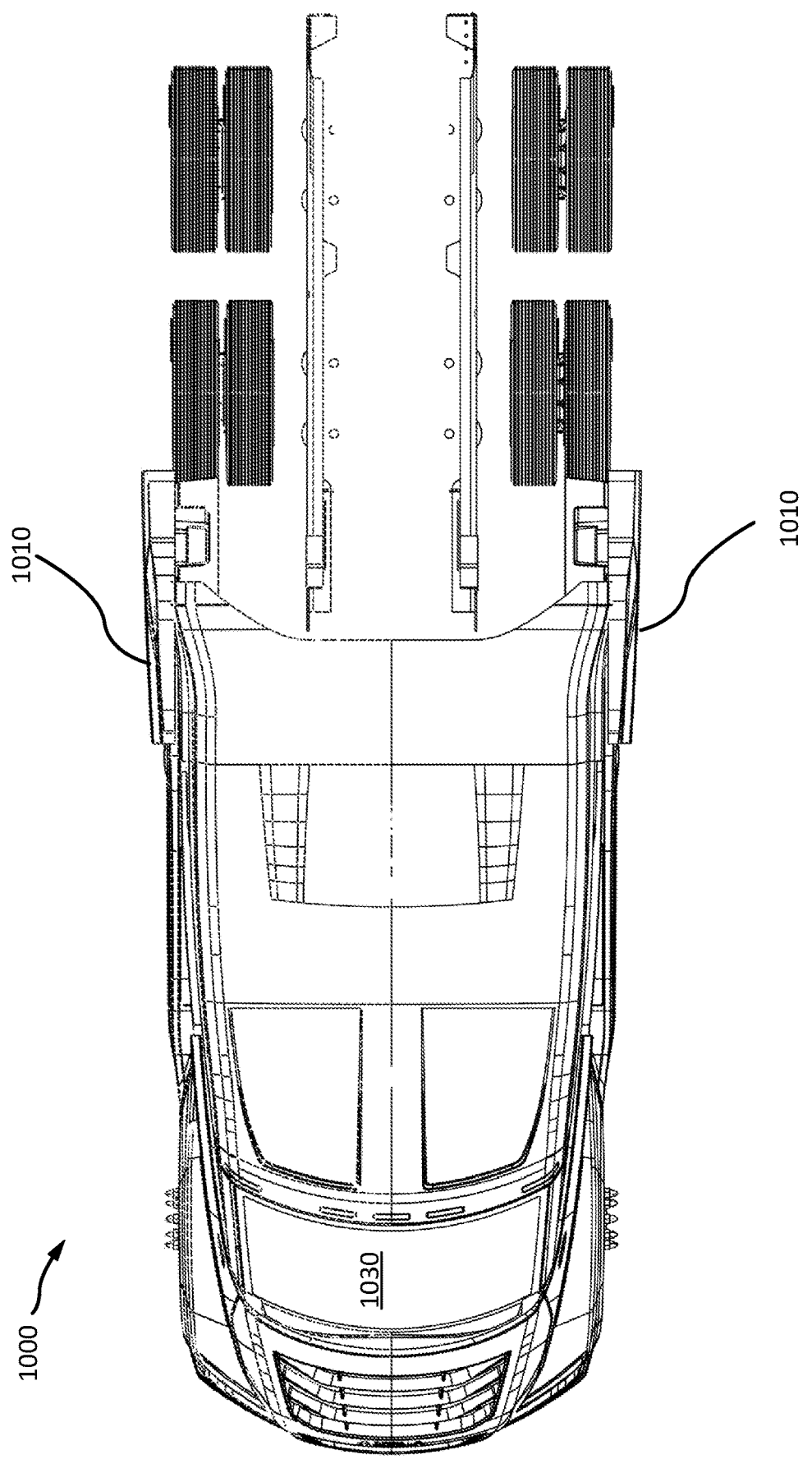
FIG. 10F is a top view of the vehicle of FIG. 10E with a side cargo door open.

In various embodiments, cargo door 1010 is configured with a width greater than the width of a passenger door, such as door 110 of FIG. 1. For example, cargo door 1010 may be configured with a width of between about 48 inches and about 72 inches. As illustrated in FIGS. 10B, 10D, and 10E, in various embodiments, cargo, such as a load of cargo secured to a pallet, can be placed within cabin interior 1050 of vehicle 1000 through the opening created by operation of cargo door 1010.

Cargo door 1010 can comprise a sliding door. For example, cargo door 1010 can slide along a sliding door track that connects with the cargo door 1010 and provides a path for the cargo door 1010 to slide when opening or closing. In an embodiment, the vehicle 1000 includes an upper door track, a mid-track, and a lower door track. In an embodiment, the vehicle 1000 includes a single sliding door track. The sliding door track is configured to permit cargo door 1010 to be smoothly opened without applying a significant amount of pressure.

In some embodiments, vehicle 1000 comprises a cargo door 1010 positioned on one side of vehicle 1000, and a passenger door positioned on the opposite side of vehicle 1000. For example, vehicle 1000 can comprise a cargo door 1010 positioned on the driver's side and a passenger door positioned on the passenger's side. In other embodiments, vehicle 1000 can comprise a cargo door 1010 positioned on the passenger's side and a passenger door positioned on the driver's side. It will be appreciated that any combination of cargo door(s) 1010 and passenger door(s) is within the scope of the present disclosure.

In some exemplary embodiments, cargo door(s) 1010 may be configured with particular components and/or functions (for example, hinges, tracks, locks, and/or the like) which differ from a smaller door or door(s) on or in vehicle 1000. For example, in one exemplary embodiment, vehicle 1000 may be configured with a cargo door 1010 operative on a sliding track, while vehicle 1000 is also configured with a passenger door operative in connection with a set of rotating hinges. In this manner, vehicle 1000 may be shaped, sized, and/or configured as desired, for example in order to obtain desired options for ingress and egress of people and cargo for vehicle 1000 while still maintaining a desired characteristic or characteristics of vehicle 1000, for example size, weight, aerodynamic profile, cost to manufacture, and/or the like.

In certain embodiments, cargo door 1010 is formed of multiple moveable segments, for example multiple sliding segments, which in operation collectively form cargo door 1010 and/or enable functions thereof. In some exemplary embodiments, cargo door 1010 is configured with two panels rotating about hinges disposed on the respective edges of cargo door 1010 (i.e., in a "French" door manner). Moreover, in some embodiments, cargo door 1010 comprises a first door segment disposed on a first side of vehicle 1000 (for example, a passenger side), and a second door segment disposed on a second, different side of vehicle 1000 (for example, a rear side). In this manner, cargo door 1010 may be operative to provide a doorway/passageway into the cabin interior 1050 of vehicle 1000 aligned generally with a corner of vehicle 1000 (for example, a cargo door 1010 positioned on the passenger side of vehicle 1000 and the rear side of vehicle 1000 provides a doorway generally in the rear passenger side corner of vehicle 1000; a cargo door 1010 positioned on the driver's side of vehicle 1000 and the rear side of vehicle 1000 provides a doorway generally in the rear driver's side corner of vehicle 1000; and so forth).

Yet further, portions of cargo door 1010 on a first side of vehicle 1000 may differ in size, components, or function from portions of cargo door 1010 on a second side of vehicle 1000. For example, a portion of cargo door 1010 on the rear side of vehicle 1000 may operate in a sliding manner, while another portion of cargo door 1010 on a passenger side of vehicle 1000 may operate via rotation about a hinge. In this manner, portions of cargo door 1010 may at least partially overlap, interlock, retract, or otherwise be positioned in a desired manner to facilitate ingress and/or egress of cabin interior 1050.

EXAMPLES

The following examples pertain to further embodiments.

Example 1 is a vehicle including a body and a cabin located within the body of the vehicle. The cabin comprises an interior that is configured to accommodate at least one person. The vehicle includes at least one seat located in the interior of the cabin and the seat is configured for seating a user. The vehicle includes at least one door that provides ingress and egress of the interior of the cabin of the vehicle, and the at least one door is located with respect to the body of the vehicle, such that it provides ingress and egress of the cabin from a backside of the seat.

Example 2 is a vehicle as in Example 1, wherein the vehicle is an electric vehicle including a battery pack that is coupled to an electric drive train.

Example 3 is a vehicle as in any of Examples 1-2, wherein the vehicle includes a combustion engine configured to generate power by using combustion energy of fuel.

Example 4 is a vehicle as in any of Examples 1-3, wherein the vehicle includes only a single door.

Example 5 is a vehicle as in Example 4, wherein the single door is located on a driver's side of the vehicle.

Example 6 is a vehicle as in Example 4, wherein the single door is located on a passenger's side of the vehicle.

Example 7 is a vehicle as in any of Examples 1-3, wherein the at least one door of the vehicle includes a first door and a second door.

Example 8 is a vehicle as in Example 7, wherein the first door is located on a driver's side of the vehicle and the second door is located on a passenger's side of the vehicle.

Example 9 is a vehicle as in any of Examples 1-8, wherein the door slides on an upper track, a mid-track, and a lower track located externally on the body of the vehicle to open and close the at least one door.

Example 10 is a vehicle as in Example 9, wherein the at least one door moves outward with respect to the body and backward with respect to the at least one seat as the door is moved to an open position.

Example 11 is a vehicle as in Example 10, wherein an activation signal turns on a drive motor to pull the at least one door open and closed.

Example 12 is a vehicle as in Example 1, wherein the at least one door is hinged at one end and attached to the body of the vehicle to open and close the at least one door.

Example 13 is a vehicle as in Example 1, wherein the at least one door is the foremost door providing ingress or egress of the interior of the cabin.

Example 14 is a vehicle as in any of Examples 1-13, wherein there is no additional door that is located in front of the at least one door providing ingress or egress of the interior of the cabin.

Example 15 is a vehicle as in any of Examples 1-14, wherein the at least one door includes a peak load sensor configured to sense a threshold, such that when a load on the at least one door is higher than the threshold, a control unit reverses the direction of the at least one door and prohibits the at least one door from closing.

Example 16 is a vehicle as in any of Examples 1-15, wherein the at least one door is located approximately at a midpoint of the body of the vehicle to provide ingress and egress of the cabin.

Example 17 is a vehicle as in any of Examples 1-16, wherein the vehicle is a semi-truck.

Example 18 is a vehicle as in any of Examples 1-17, wherein the vehicle is an electric driven class 7 semi-truck.

Example 19 is a vehicle as in any of Examples 1-17, wherein the vehicle is an electric driven class 8 semi-truck.

Example 20 is a vehicle as in any of Examples 1-19, wherein the vehicle further comprises a sleeper within the cabin.

Example 21 is a vehicle as in any of Examples 1-20, wherein the at least one door opens into the sleeper of the cabin.

Example 22 is a vehicle as in Example 20, wherein the sleeper includes a bunk bed, a refrigerator having a volume that is at least 15 cubic feet, a table, and a microwave oven.

Example 23 is a vehicle as in any of Examples 1-22, wherein the cabin includes a driver's seat and a passenger's seat, and wherein access to the driver's seat is provided between the passenger's seat and the driver's seat.

Example 24 is a vehicle as in any of Examples 1-23, wherein an opening into the cabin includes a clearance that is at least six feet five inches in height.

Example 25 is a vehicle as in any of Examples 1-24, wherein the vehicle further comprises a sleeper and wherein entry into the cabin of the vehicle provides full access to the at least one seat and the sleeper simultaneously.

Example 26 is a vehicle as in any of Examples 1-25, wherein the vehicle further includes at least one full-size step and at least one handhold to provide at least two points of leverage for access and entry into the interior of the cabin.

Example 27 is a vehicle as in Example 26, wherein there are two steps and two handholds that provide four points of leverage for entry into the interior of the cabin, such that a user enters into the cabin facing forward.

Example 28 is a vehicle comprising a body having a front end and a rear end. The vehicle includes a plurality of front wheels located proximally with respect to the body and a plurality of rear wheels located distally with respect to the body. The front wheels include a first rear most location that is a first distance from the front end of the body and a second front most location that is a second distance from the front end of the body. The first distance is greater than the second distance. The vehicle includes a cabin located within the body, wherein the cabin includes an interior with at least one seat located in the interior that is configured for seating at least one person. The majority of the at least one seat is located within the first distance of the front wheels.

Example 29 is a vehicle as in Example 28, wherein the body of the vehicle includes a plurality of front wheel wells that correspond to the plurality of front wheels. The front wheel wells include a front most portion and a rear most portion with a horizontal distance therebetween. The entirety of the at least one seat is located within the horizontal distance of the front wheel wells.

Example 30 is a vehicle as in any of Examples 28-29, wherein the at least one door is located with respect to the body, such that the at least one door opens to provide ingress and egress of the cabin from a backside of at least one seat.

Example 31 is a vehicle as in any of Examples 28-30, wherein the body of the vehicle includes an opening having a width and a height that corresponds with the at least one door, and wherein there is no seat inside the cabin that obstructs the width of the opening.

Example 32 is a vehicle as in any of Examples 28-31, wherein the vehicle is an electric vehicle including a plurality of electric motors and a plurality of gear trains that each correspond with each of the plurality of electric motors.

Example 33 is a vehicle as in any of Examples 28-32, wherein the vehicle includes a combustion engine configured to generate power by using combustion energy of fuel.

Example 34 is a vehicle as in any of Examples 28-33, wherein the vehicle includes only a single door.

Example 35 is a vehicle as in Example 34, wherein the single door is located on a driver's side of the vehicle.

Example 36 is a vehicle as in Example 34, wherein the single door is located on a passenger's side of the vehicle.

Example 37 is a vehicle as in any of Examples 28-33, wherein the at least one door of the vehicle includes a first door and a second door.

Example 38 is a vehicle as in Example 37, wherein the first door is located on a driver's side of the vehicle and the second door is located on a passenger's side of the vehicle.

Example 39 is a vehicle as in any of Examples 28-38, wherein the at least one door slides on an upper track, a mid-track, and a lower track located externally on the body of the vehicle to open and close the at least one door.

Example 40 is a vehicle as in Example 39, wherein the at least one door moves outward with respect to the body and backward with respect to the at least one seat as the door is moved to an open position.

Example 41 is a vehicle as in Example 40, wherein an activation signal turns on a drive motor to pull the at least one door open and closed.

Example 42 is a vehicle as in any of Examples 28-38, wherein the at least one door is hinged at one end and attached to the body of the vehicle to open and close the at least one door.

Example 43 is a vehicle as in any of Examples 28-42, wherein the at least one door is the foremost door providing ingress or egress of the interior of the cabin.

Example 44 is a vehicle as in any of Examples 28-43, wherein there is no additional door that is located in front of the at least one door providing ingress or egress of the interior of the cabin.

Example 45 is a vehicle as in any of Examples 28-44, wherein the at least one door includes a peak load sensor configured to sense a threshold, such that when a load on the at least one door is higher than the threshold a control unit reverses the direction of the at least one door and keeps the at least one door from closing.

Example 46 is a vehicle as in any of Examples 28-45, wherein the at least one door is located approximately at a midpoint of the body of the vehicle to provide ingress and egress of the cabin.

Example 47 is a vehicle as in any of Examples 28-46, wherein the vehicle is a semi-truck.

Example 48 is a vehicle as in any of Examples 28-47, wherein the vehicle is an electric driven class 7 semi-truck.

Example 49 is a vehicle as in any of Examples 28-47, wherein the vehicle is an electric driven class 8 semi-truck.

Example 50 is a vehicle as in any of Examples 28-49, wherein the vehicle further comprises a sleeper within the cabin.

Example 51 is a vehicle as in any of Examples 28-50, wherein the vehicle further includes a sleeper within the cabin and the at least one door opens into the sleeper of the cabin.

Example 52 is a vehicle as in any of Examples 28-51, wherein the vehicle further includes a sleeper within the cabin and the sleeper includes a bunk bed, a refrigerator having a volume that is at least 15 cubic feet, a table, and a microwave oven.

Example 53 is a vehicle as in any of Examples 28-52, wherein the vehicle further includes a sleeper within the cabin and wherein entry into the cabin of the vehicle provides full access to the at least one seat and the sleeper simultaneously.

Example 54 is a vehicle as in any of Examples 28-53, wherein the opening into the cabin includes a height that is at least six feet five inches.

Example 55 is a vehicle as in any of Examples 28-54, wherein the cabin includes a driver's seat and a passenger's seat, and wherein access to the driver's seat is provided between the passenger's seat and the driver's seat.

Example 56 is a vehicle as in any of Examples 28-55, wherein the vehicle further includes at least one full-size step and at least one handhold to provide at least two points of leverage for access and entry into the interior of the cabin.

Example 57 is a vehicle as in any of Examples 28-56, wherein the vehicle further includes two steps and two handholds that provide four points of leverage for entry into the interior of the cabin, such that a user enters into the cabin facing forward.

Example 58 is a vehicle as in any of Examples 1-57, wherein the vehicle is a hybrid vehicle comprising electrical and combustion components.

Example 59 is a vehicle including a body and a cabin located within the body of the vehicle. The cabin comprises an interior that is configured to accommodate at least one person. The vehicle includes at least one seat located in the interior of the cabin and the seat is configured for seating a user. The vehicle includes at least one cargo door that provides ingress and egress of the interior of the cabin of the vehicle, and the at least one cargo door is located (with respect to the body of the vehicle) such that it provides ingress and egress of the cabin from a backside of the seat. The cargo door can accommodate the placement and eventual removal of cargo, such as a cargo load secured to a pallet, inside of the cabin.

Example 60 is a vehicle as in Example 59, further comprising a passenger door positioned opposite the cargo door.

Example 61 is a vehicle as in Example 59, further comprising a passenger door positioned on a different side of the vehicle body from the cargo door.

Principles of the present disclosure may be combined with principles taught and/or illustrated in: U.S. patent application Ser. No. 16/412,748 filed on May 15, 2019 and entitled "SYSTEMS, METHODS, AND DEVICES FOR AN AUTOMOBILE DOOR OR WINDOW"; and U.S. patent application Ser. No. 16/381,434 filed on Apr. 11, 2019 and entitled "WRAP AROUND VEHICLE WINDSHIELD". The disclosures of each the foregoing applications are incorporated herein by reference in their entireties, but except for any subject matter disclaimers or disavowals, and except to the extent that the incorporated material is inconsistent with the express disclosure herein, in which case the language in this disclosure shall control.

In the above disclosure, reference has been made to the accompanying drawings, which form a part hereof, and in which is shown by way of illustration specific embodiments in which the disclosure may be practiced. It is understood that other embodiments may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate embodiments may be used in any combination desired to form additional hybrid embodiments of the disclosure.

Further, although specific embodiments of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A semi-truck vehicle comprising:
   an electric drive unit;
   a body;
   a cabin located within the body of the semi-truck vehicle, wherein the cabin comprises an interior that is configured to accommodate at least one person;
   at least one seat located in the interior of the cabin that is configured for seating a user; and
   a cargo door comprising a width extending a horizontal length of the door,
   wherein the cargo door provides ingress and egress of the interior of the cabin of the semi-truck vehicle,
   wherein the cargo door is located on the body such that a frontmost side of the cargo door is adjacent to a rearmost portion of a front wheel and the width of the cargo door is disposed between the frontmost side of the cargo door and a rearmost side of the cargo door, at least a portion of the cargo door being positioned behind the seat and at least a portion of the seat disposed to be forward of a line defining the rearmost portion of the front wheel well such that the cargo door opens to provide ingress and egress of the cabin from a backside of the seat, and
   wherein the cargo door is the foremost door providing ingress or egress of the interior of the cabin.

2. The semi-truck vehicle of claim 1, wherein the semi-truck vehicle is an electric vehicle comprising a battery pack that is coupled to the electric drive unit.

3. The semi-truck vehicle of claim 1, wherein the semi-truck comprises only a single door.

4. The semi-truck vehicle of claim 3, wherein the single door is located on a left side when the user is seated in the seat of the semi-truck vehicle.

5. The semi-truck vehicle of claim 1, wherein the semi-truck comprises a second door positioned on the opposite side of the body as the cargo door.

6. The semi-truck vehicle of claim 5, wherein the second door comprises a passenger door having a width less than the width of the cargo door.

7. The semi-truck vehicle of claim 5, wherein the second door comprises a second cargo door.

8. The semi-truck vehicle of claim 1, wherein the cargo door slides on at least one of an upper track, a mid track, or a lower track located externally on the body to open and close the door.

9. The semi-truck vehicle of claim 8, wherein the cargo door moves outward with respect to the body and backwards with respect to the seat as the door is moved to an open position.

10. The semi-truck vehicle of claim 1, wherein the width of the cargo door is between 48 inches and 72 inches.

11. The semi-truck vehicle of claim 1, wherein the semi-truck vehicle is a class 8 semi-truck.

12. The semi-truck vehicle of claim 1, further comprising at least one full-size step and at least one handhold to provide at least two points of leverage and for access and entry into the interior of the cabin.

13. A semi-truck vehicle comprising:
   an electric drive unit;
   a body;
   a cabin located within the body of the semi-truck vehicle, wherein the cabin comprises an interior that is configured to accommodate at least one person;
   at least one seat located in the interior of the cabin that is configured for seating a user;
   a cargo door comprising a width extending a horizontal length of the door,
      wherein the cargo door is the foremost door providing ingress and egress of the interior of the cabin of the semi-truck vehicle, and
      wherein the cargo door is located on the body such that a frontmost side of the cargo door is adjacent to a rearmost portion of a front wheel and the width of the cargo door is disposed between the frontmost side of the cargo door and a rearmost side of the cargo door, at least a portion of the cargo door being positioned behind the seat and at least a portion of the seat disposed to be forward of a line defining the rearmost portion of the front wheel well such that the cargo door opens to provide ingress and egress into the cabin from a backside of the seat; and a passenger door positioned on an opposite side of the body as the cargo door.

14. The semi-truck vehicle of claim 13, wherein the single door is located on a left side when the user is seated in the seat.

15. The semi-truck vehicle of claim 13, wherein the passenger door comprises a width less than the width of the cargo door.

16. The semi-truck vehicle of claim 13, wherein the cargo door slides on at least one of an upper track, a mid track, or a lower track located externally on the body to open and close the door.

17. The semi-truck vehicle of claim 16, wherein the cargo door moves outward with respect to the body and backwards with respect to the seat as the door is moved to an open position.

18. The semi-truck vehicle of claim 13, wherein the width of the cargo door is between 48 inches and 72 inches.

19. The semi-truck vehicle of claim 13, wherein the semi-truck vehicle is a class 8 semi-truck.

20. A semi-truck vehicle comprising:
an electric drive unit;
a body;
a cabin located within the body of the semi-truck vehicle, wherein the cabin comprises an interior that is configured to accommodate at least one person;
at least one seat located in the interior of the cabin that is configured for seating a user; and
a cargo door comprising at least two door portions that are adjacent to one another,
wherein the cargo door provides ingress and egress of the interior of the cabin of the semi-truck vehicle,
wherein the cargo door is the foremost door providing ingress or egress of the interior of the cabin,
wherein a first portion of the cargo door is disposed on a first side of the body, and
wherein a second portion of the cargo door is disposed on a second, rear side of the body.

* * * * *